(12) United States Patent
Staudinger et al.

(10) Patent No.: US 7,706,673 B1
(45) Date of Patent: Apr. 27, 2010

(54) PORTABLE REMOTE CAMERA CONTROL DEVICE

(76) Inventors: Robert J. Staudinger, 807 Stech Dr., Bridgewater, NJ (US) 08807; Maria Chevere-Santos, 2704 Lynbrook Dr., Yardley, PA (US) 19067; Ruijun Zhou, 845 51$^{st}$ St., Brooklyn, NY (US) 11220

( * ) Notice: Subject to any disclaimer, the term of this patent is extended or adjusted under 35 U.S.C. 154(b) by 213 days.

(21) Appl. No.: 11/697,406

(22) Filed: Apr. 6, 2007

(51) Int. Cl.
*G03B 17/00* (2006.01)
*H04N 5/232* (2006.01)

(52) U.S. Cl. .................. 396/58; 396/425; 396/428; 348/211.2; 348/376

(58) Field of Classification Search ............ 396/58, 396/59, 56, 419–428; 348/211.99, 211.1, 348/211.2, 373, 376
See application file for complete search history.

(56) References Cited

U.S. PATENT DOCUMENTS

| | | | |
|---|---|---|---|
| 2,868,096 A | 1/1959 | Rothfjell | |
| 4,530,580 A | 7/1985 | Ueda et al. | |
| 5,768,645 A | 6/1998 | Kessler | |
| 6,130,992 A | 10/2000 | Hamlin | |
| 6,862,407 B2 * | 3/2005 | Gale | 396/59 |
| 6,923,542 B2 | 8/2005 | Harris | |
| 6,955,484 B2 | 10/2005 | Woodman | |
| 6,988,802 B2 | 1/2006 | Harris | |
| 6,994,436 B2 | 2/2006 | Harris | |
| 2003/0044180 A1 | 3/2003 | Lindberg | |
| 2005/0031335 A1 | 2/2005 | Itzkowitz | |

* cited by examiner

*Primary Examiner*—Rochelle-Ann J Blackman
(74) *Attorney, Agent, or Firm*—Gauthier & Connors LLP

(57) ABSTRACT

A portable camera actuation system is disclosed that may be used for taking self-portraits. The system includes an extendable handle assembly that may be held by a user at a first end thereof, and a base unit coupled to a second end of said extendable handle assembly. The base unit is for receiving a camera mounted thereon. The system also includes a remote shutter transmitter unit for providing a wireless shutter signal, and a remote wireless signal receiver unit. The remote shutter transmitter unit is provided at a location that is remote from the camera. The wireless shutter signal receiver unit is coupled to the base unit and is for providing actuation of an external shutter button on the camera responsive to the wireless shutter signal.

64 Claims, 12 Drawing Sheets

PORTABLE REMOTE CAMERA CONTROL DEVICE

BACKGROUND

The invention generally relates to camera accessories, and relates in particular to camera accessories for facilitating the taking of pictures from a location that is remote from a location of the camera.

While many camera accessories have been developed for assisting users in taking self portraits, such systems have either involve the use of a tripod and a timer on the camera, or require that the camera itself provide an internal connector for connecting the camera's shutter actuator control assembly to a remote actuation device.

For example, U.S. Pat. No. 4,530,580 discloses a telescopic extender for supporting a compact camera that includes a head member to be attached to the camera, a grip to be held by a user, and a telescoping rod member connecting the head member to the grip. Actuation of the camera is disclosed to be achieved by a remote electronic switch that is disclosed to be connected in parallel with the shutter activation switch on the camera. Such a system, however, requires that the camera be specially designed or modified to include a socket with internal contacts that are connected in parallel with the shutter activation switch on the camera. The '580 patent states that if the camera does not have a socket to receive a remote electronic switch, then the camera's self timer may be used.

U.S. Pat. No. 5,768,645 discloses an alignment means for a disposable camera that assists a user in taking self and group portraits. The alignment means is disclosed to include one or two supporting arms, and a mirror on the front face of the camera for the user to look at to observe himself when taking a self-portrait. Actuation of the camera is disclosed to be achieved via an air bubble 44 that is coupled to a pneumatic cable 42 that raises a pin and thereby releases the shutter of a camera (not shown). There is no further disclosure, however, of how the bubble 42 and pneumatic cable 42 cause the camera shutter to be released, and it is not at all clear from FIG. 16 how this would occur unless access to the camera shutter switch inside the camera is somehow provided.

U.S. Pat. No. 6,923,542 discloses a remote camera and positioning control system that includes one or more beam modules that are disclosed to have improved cross-sectional flexural rigidity for permitting the camera to be positioned and moved smoothly while minimizing image instability. The actuation controls of the video camera are controlled by a joystick interface that is coupled via electronic cables to a remote control access port in the camera.

There remains a need for a portable remote camera control device that does not require accessing interior control functionality within the camera, and may be used, therefore, with disposable or digital cameras. There is further a need for such a device that is also portable and collapses to a conveniently carried size.

SUMMARY

The invention provides a portable camera actuation system that may be used for taking self-portraits. The system includes an extendable handle assembly that may be held by a user at a first end thereof, and a base unit coupled to a second end of said extendable handle assembly. The base unit is for receiving a camera mounted thereon. In accordance with an embodiment, the system also includes a remote shutter transmitter unit for providing a wireless shutter signal, and a remote wireless signal receiver unit. The remote shutter transmitter unit is provided at a location that is remote from the camera. The wireless shutter signal receiver unit is coupled to the base unit and is for providing actuation of an external shutter button on the camera responsive to the wireless shutter signal.

In accordance with another embodiment, the system also include an alignment unit for permitting a user of the system and a camera to verify proper alignment of the camera with respect to a subject, and in certain embodiments, the alignment unit may include a plurality of indicators that may be light emitting diodes. In accordance with further embodiments, the portable camera actuation system may be folded to a very small size.

BRIEF DESCRIPTION OF THE DRAWINGS

The following description may be further understood with reference to the accompanying drawings in which.

The drawings are shown for illustrative purposes only.

DETAILED DESCRIPTION

Figure 1:
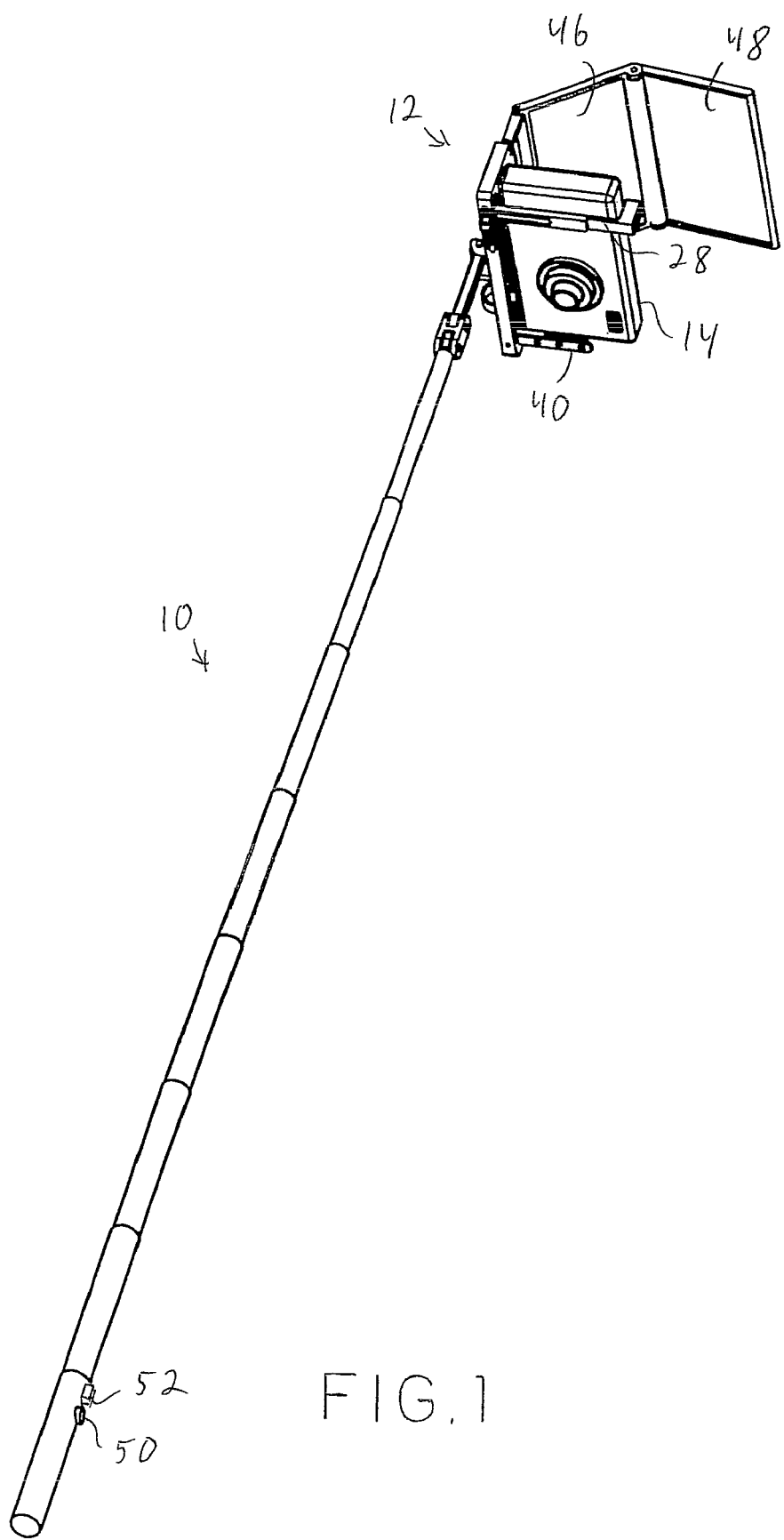
FIG. 1 shows an illustrative diagrammatic view of a system in accordance with an embodiment of the invention.
Figure 2:
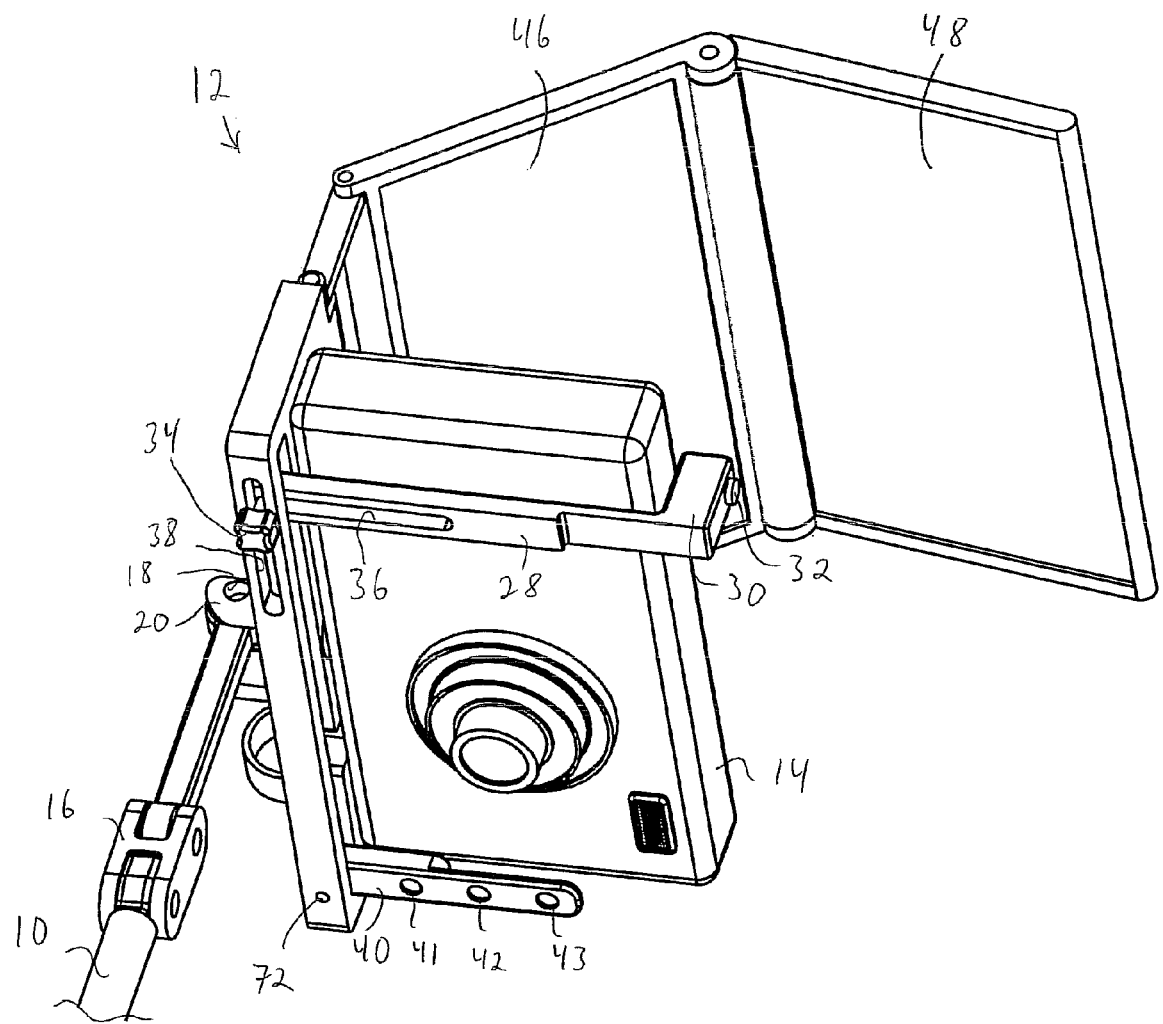
FIG. 2 shows an illustrative diagrammatic view of a portion of the system shown in FIG. 1.

As shown in FIG. 1 a system in accordance with a preferred embodiment of the invention includes a telescoping wand 10 that is coupled to a base unit 12 that is adapted to hold a relatively small light weight camera 14 such as a digital camera, a small 35 mm camera or a disposable camera. The telescoping wand 10 includes a double hinge unit 16 near the base unit 12, and is coupled to the base unit 12 via a hinged joint 18 mounted on a rotating post 20 as further shown in FIGS. 2 and 3. The camera 14 is mounted to the base unit 12 by a treaded thumb screw 22 (shown in FIG. 3) that is slidably received within a slot 24 in a platform 26 in the base unit 12. The thumb screw 22 includes threads that mate with internal threads on a camera that are conventionally used to mount the camera on a tripod.

The platform 26 of the base unit 12 includes an actuator arm 28 that is adjustably mounted to the platform 26 and includes an actuator portion 30 having an actuator post 32 that may be actuated so as to cause the camera 14 to take a picture by depressing the actuator button on the camera 14. The arm 28 may be adjusted to accommodate cameras of different sizes by the dual-axis sliding actuator knob 34 that passes through slot 36 in the arm 28 as well as slot 38 in the platform 26.

The platform 26 also includes an alignment indicator unit 40 that includes a plurality of alignment indicators 41, 42 and 43 such as illumination sources or reflectors. The base unit 12 also includes a plurality of mirror elements 46 and 48 that are pivotally to each other, and one of which is pivotally mounted to the base unit 12.

Figure 4:
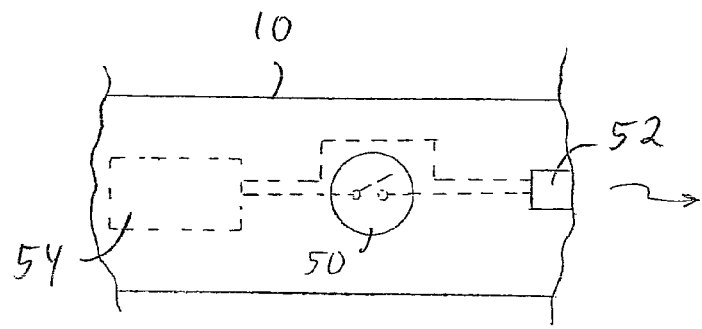
FIG. 4 shows an illustrative diagrammatic view of a portion of the telescoping wand in the system shown in FIG. 1.
Figure 7:
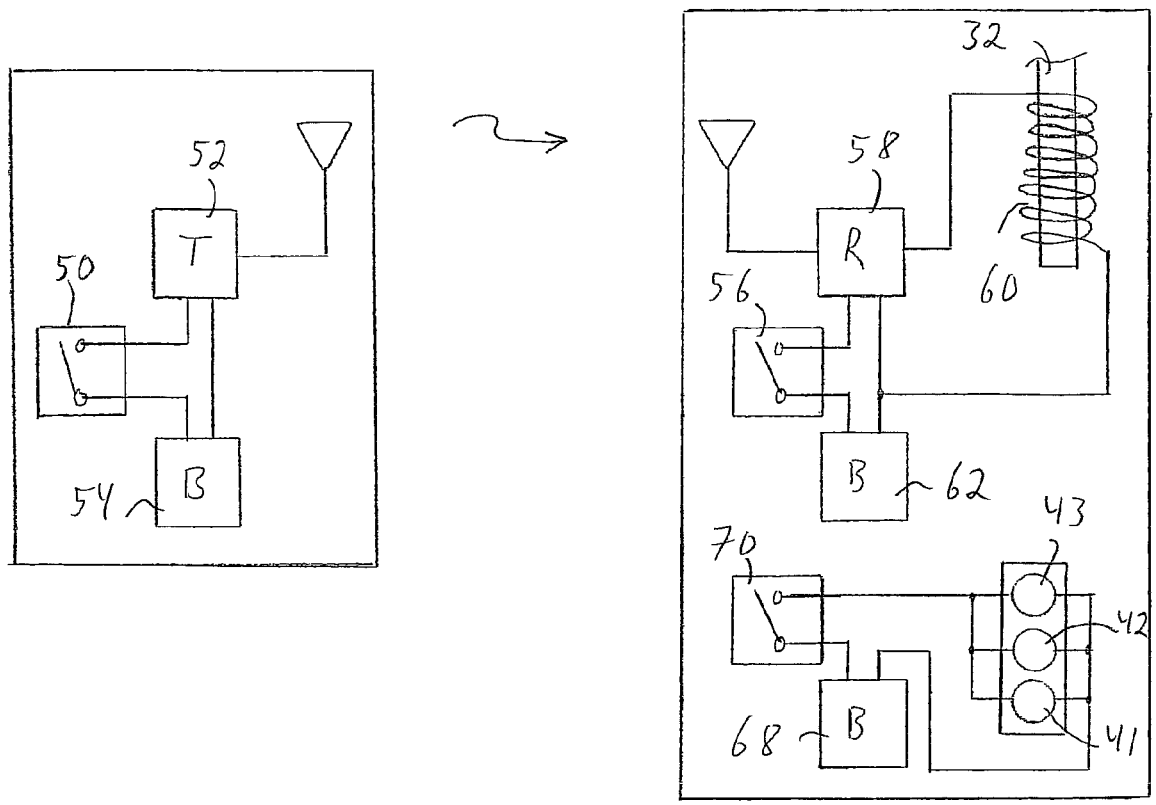
FIG. 7 shows an illustrative schematic view of electronic circuits for use in a system in accordance with an embodiment of the invention.
Figure 5:
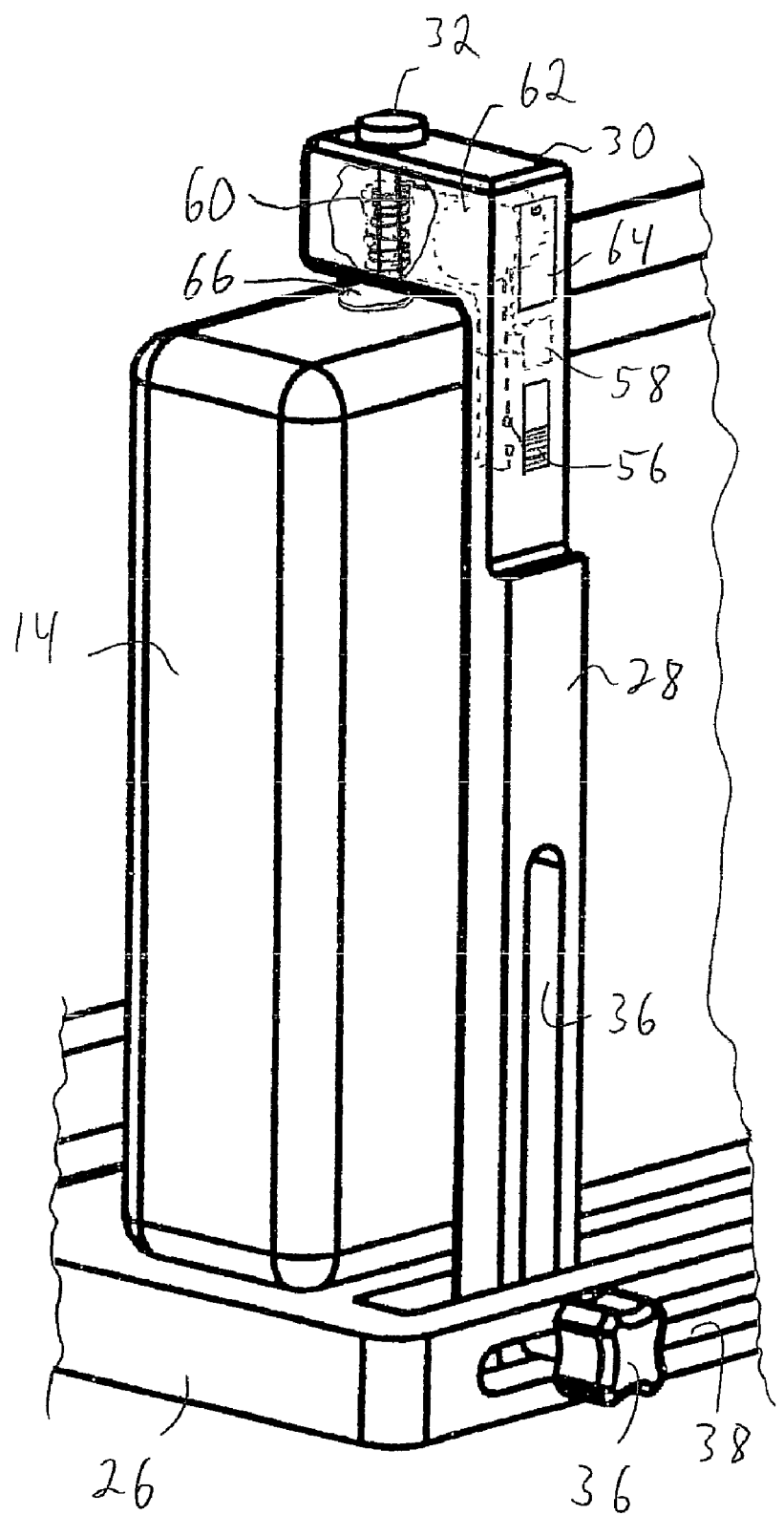
FIG. 5 shows an illustrative diagrammatic view of the camera actuation unit in the system shown in FIG. 2.

As shown in FIGS. 1, 4 and 7, the telescoping wand 10 includes an actuator button switch 50 as well as an infrared transmitter 52, as well as a battery 54 that is positioned within the wand 10. As shown in FIGS. 5 and 7, the actuator arm 28 includes a switch 56, an infrared receiver unit 58, and solenoid coils 60 that surround a portion of the metal post 32 within the head portion 30 of the actuator arm 28. The arm 28 also includes a battery 62 that is received within the arm 28 through a battery access panel 64. During use, the actuator button 50 on the telescoping wand 10 may be employed to cause the actuator post 32 on the arm 28 to depress the activation button 66 on the camera 14 to thereby take a picture.

In accordance with other embodiments, the remote actuator 50 and transmitter 52 may not be provide on the wand 10, but rather may be provided in a physically independent unit such as a small remote control device. The benefit of the base unit 12 is that cameras of a wide variety may be controlled remotely using the universal actuation arm 28.

Figure 6C:
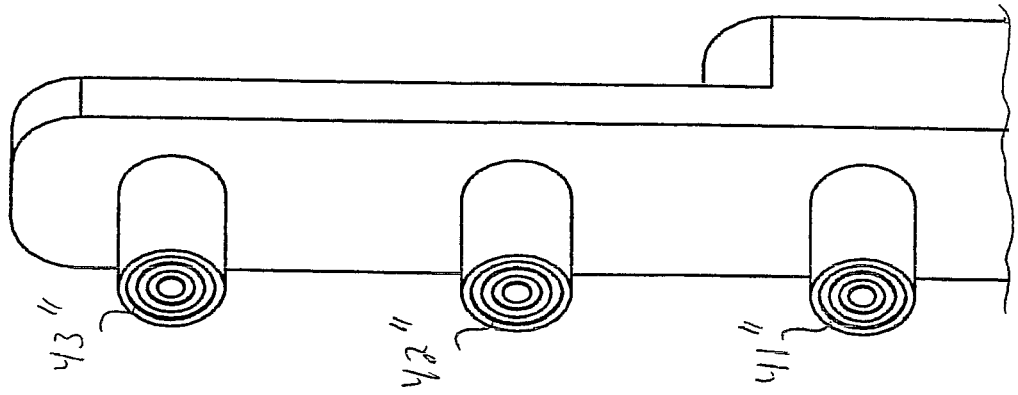
FIGS. 6A-6C show illustrative diagrammatic views of various embodiments of alignment facilitation devices in a system in accordance with an embodiment of the invention.
Figure 6B:
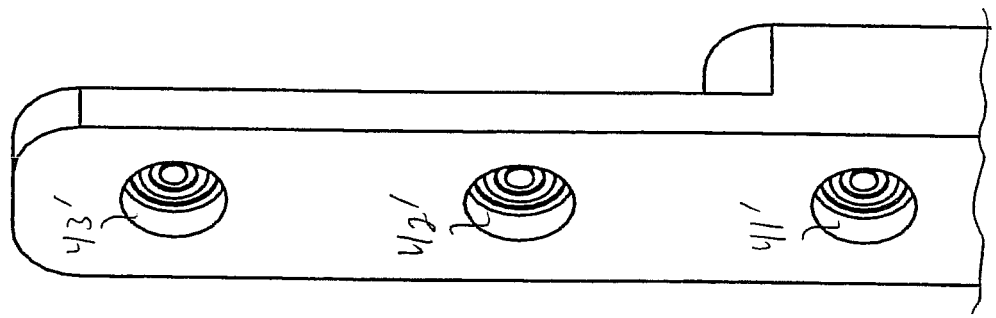
Figure 6A:
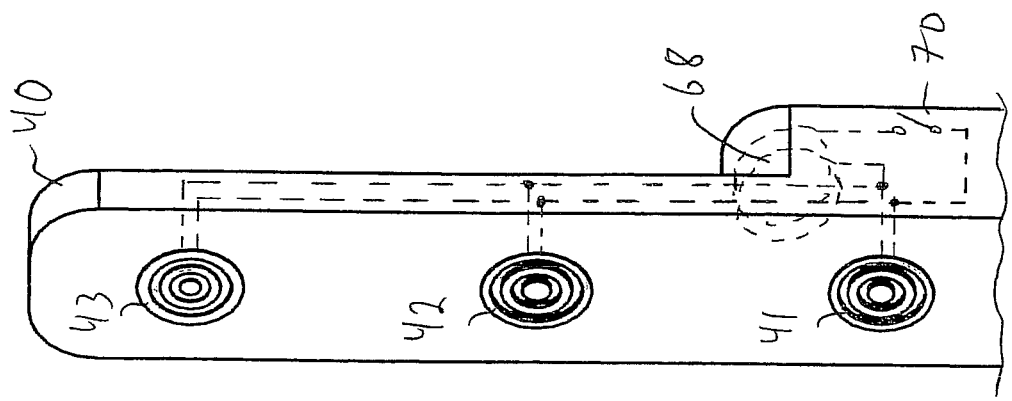

As shown in FIGS. 6A and 7, the plurality of alignment indicators 41, 42 and 43 of the unit 40 may include directional illumination sources such as light emitting diodes (LEDs) that are electrically connected to a battery 68 via a switch 70. The battery 68 is received within the alignment indicator unit 40 via a battery access panel (not shown) and the switch 70 may be a slidable actuator switch on the back side of the unit 40 that is similar to the switch 56 on the arm 28. When the indicators 41, 42 and 43 are on, a person that is standing remote from the camera and base unit may determine whether he or she is properly positioning the base unit to cause the camera lens to be directed toward their face, by identifying whether the center indicator 42 is most brightly illuminated. If the camera is directed too high, the indicator 41 will appear to be most brightly illuminated, and if the camera is directed too low, then the indicator 43 will appear to be most brightly illuminated. The directional LEDs may include a Fresnel lens or a prism surface at the outer surface thereof to facilitate directional control and/or focusing of the illumination into a focal area.

In accordance with another embodiment, the indicator 41 may be directed slightly upward and the indicator 43 may be directed slightly downward so that the user may determine whether he or she is properly positioned in the desired position with respect to the camera 14 by verifying that each of the indicators appears to be brightly illuminated. In further embodiments, the indicators 41', 42' and 43' may be provided in recessed openings as shown in FIG. 6B, or in small tubes as shown at 41", 42" and 43" in FIG. 6C. In further embodiments, the indicators 41, 42 and 43 may be provided as highly reflective surfaces that reflect ambient light and provide a directional reflection. Such highly reflective surfaces may include, for example a diffraction grating or holographic recording. When a highly reflective surface is employed that reflects ambient light, the battery 68, switch 70 and LEDs 41, 42 and 43 may be avoided, and the indicators would comprise the highly reflective surface and an optional focusing element.

The mirror elements 46 and 48 may be positioned to provide that a person standing at the location remoter from the camera is able to see an image that is made available by the camera of the current field of view of the camera. The mirror elements 46 and 48 include are adjustable to permit the user to properly arrange the mirror elements to achieve a centered photograph. In this regard, the mirror elements also provide alignment assistance to the user.

Figure 3:
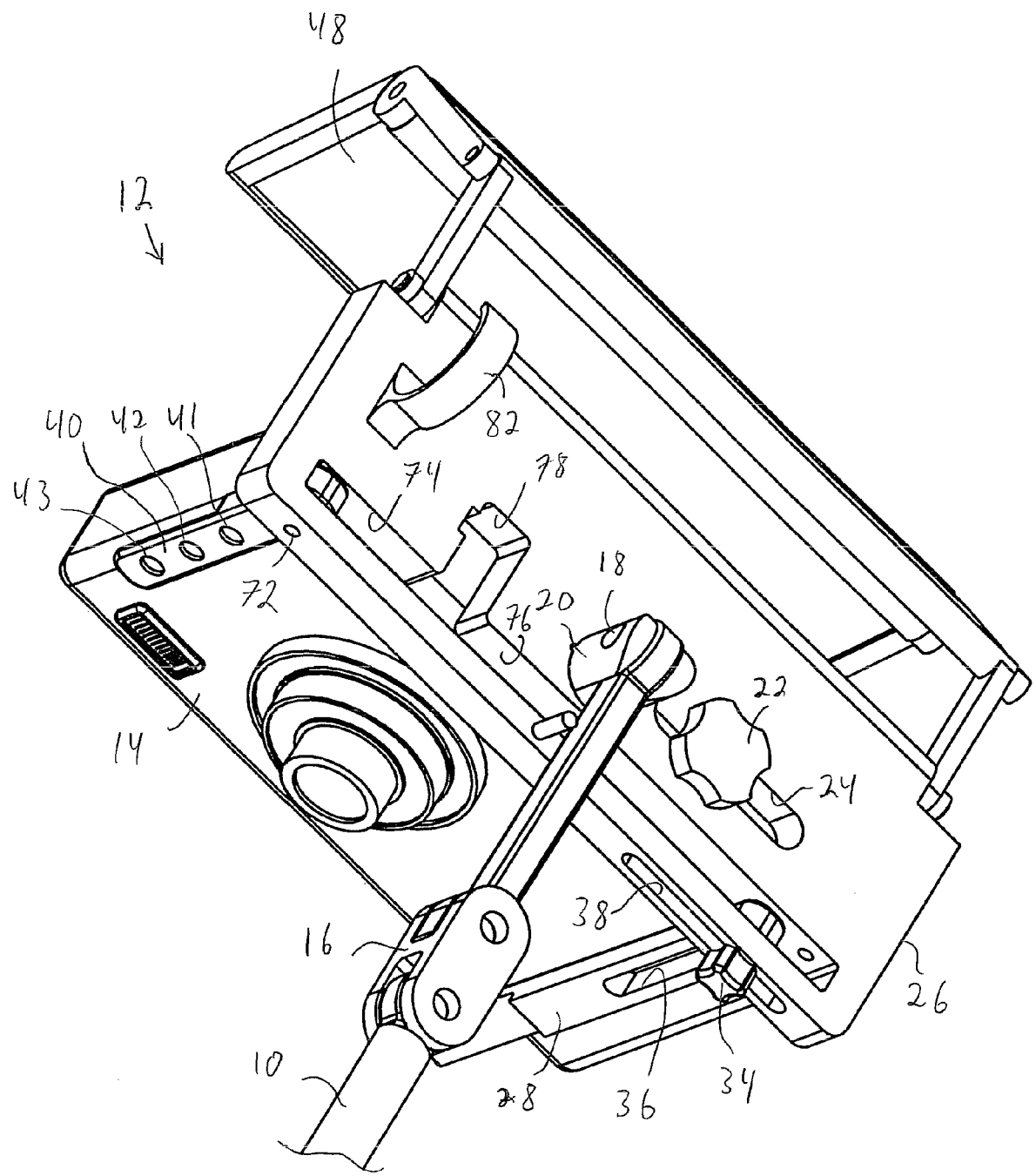
FIG. 3 shows an illustrative diagrammatic view of an underside of the portion of the system shown in FIG. 2.
Figure 8:
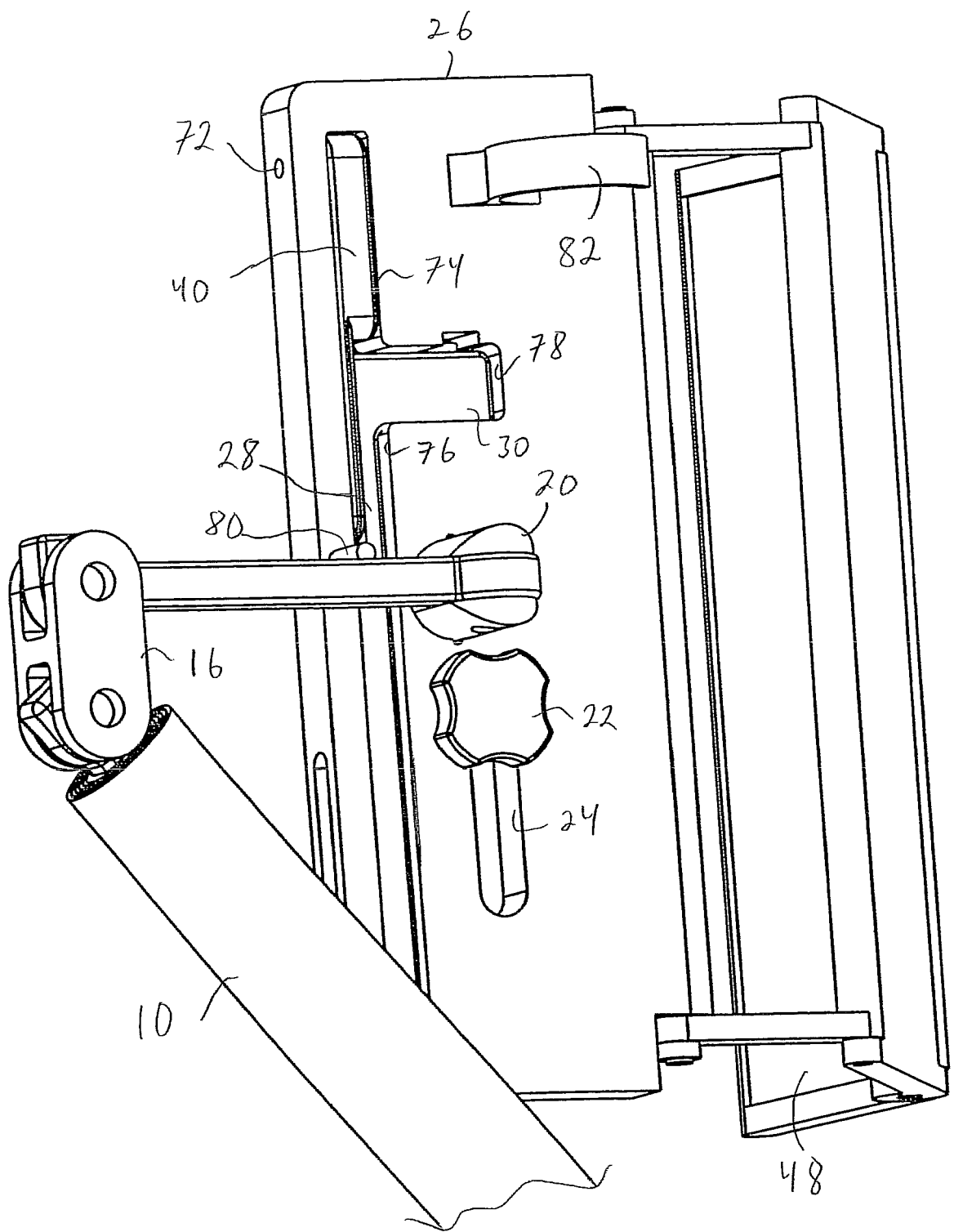
FIGS. 8-11 show illustrative diagrammatic views of the system of FIG. 1 without a camera and at different stages of being folded.

As further shown in FIGS. 3 and 8, the alignment unit 40 is rotatably mounted to the platform 26 such that the unit 40 rotates about a mounting pin 72, permitting the unit 40 to be rotated into a recess 74 in the platform 26 when the unit 40 is not being used.

Figure 9:
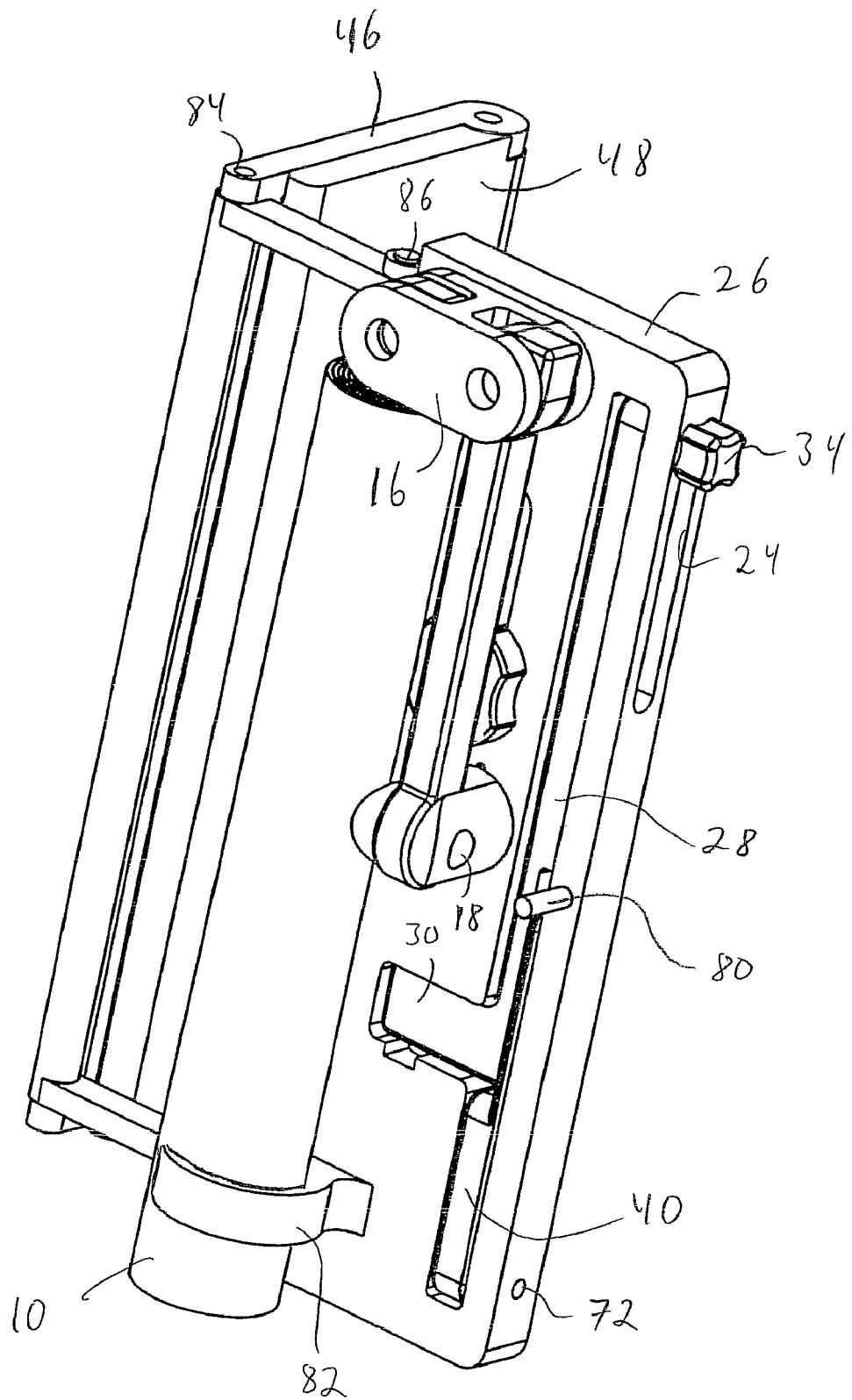

When the camera is detached from the platform 26 (e.g., by unscrewing the thumb screw 22 from the mounting threads on the bottom of the camera), the adjustment knob 34 may be loosened, and the alignment arm 28 may be rotated around the axis of the adjustment knob and received within a slot 76 in the platform 26, with the actuator portion 30 being received in a slot 78 as shown in FIG. 8 and the adjustment knob 34 slid toward one end of the slot 24 as shown in FIG. 9. If no internal threads are provided on a camera, the user may be able to secure the camera to the platform by securely fastening the alignment arm against the camera.

The platform 26 may also include a stop post 80 against which the telescoping wand 10 may positioned when fully rotated by the rotating post 20 on the platform 26. The hinge joint 18 and rotating post 20 may be used to position the camera in an any desired orientation with respect to the user.

Figure 10:
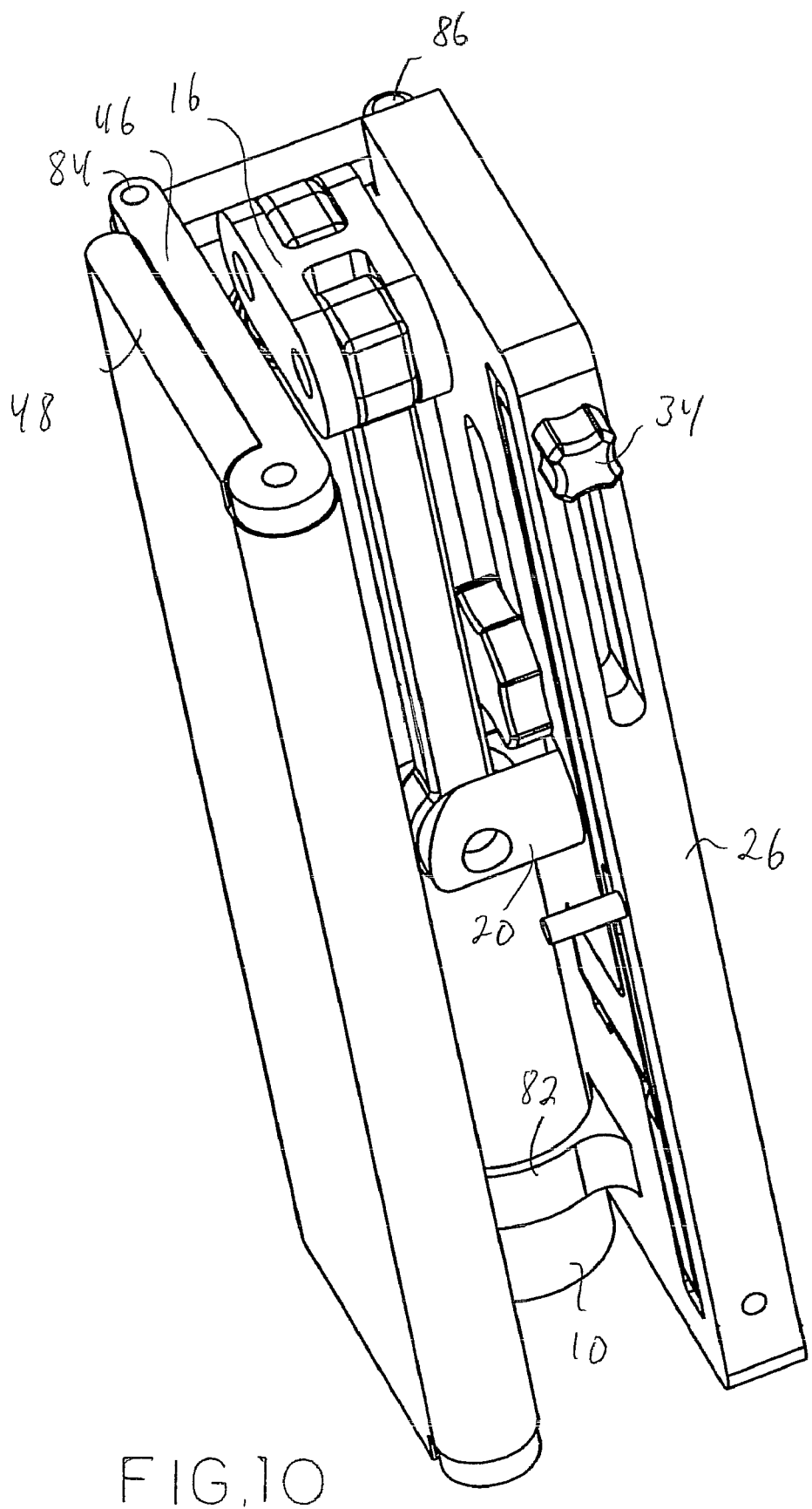
Figure 11:
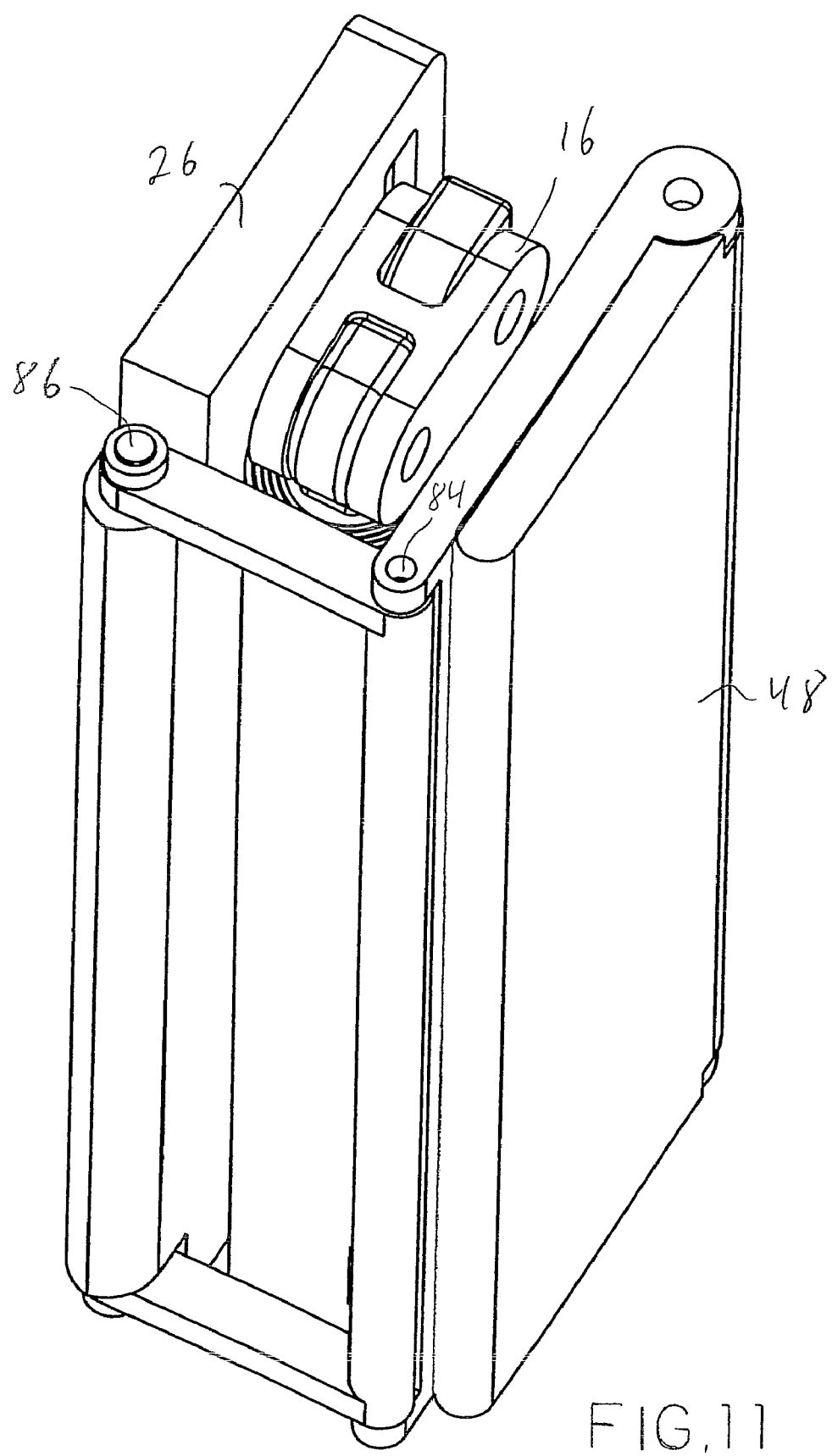

When not in use, the telescoping wand 10 may be collapsed and folded about the double hinge unit 16 so that the collapsed wand 10 may be received by a clip 82 on the back side of the platform 26 as shown in FIG. 9. The mirror element 48 may be folded inward onto the mirror element 46 as also shown in FIG. 9. The mirror element 46 together with the minor element 48 may then be rotated about hinges 84 and 86 to bring the minor element 46 close to the collapsed wand 10 as shown in FIGS. 10 and 11. The system, therefore, may be collapsed to a very small package when not in use.

Figure 12:
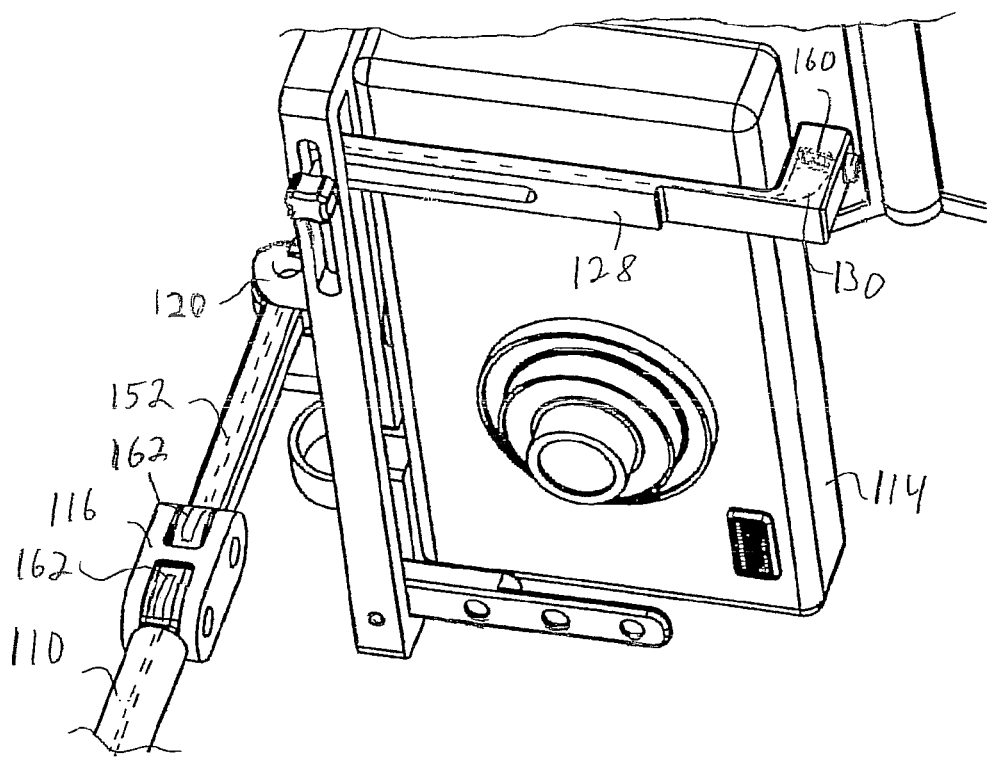
FIGS. 12-13 show illustrative diagrammatic views of a system in accordance with another embodiment of the invention.
Figure 13:
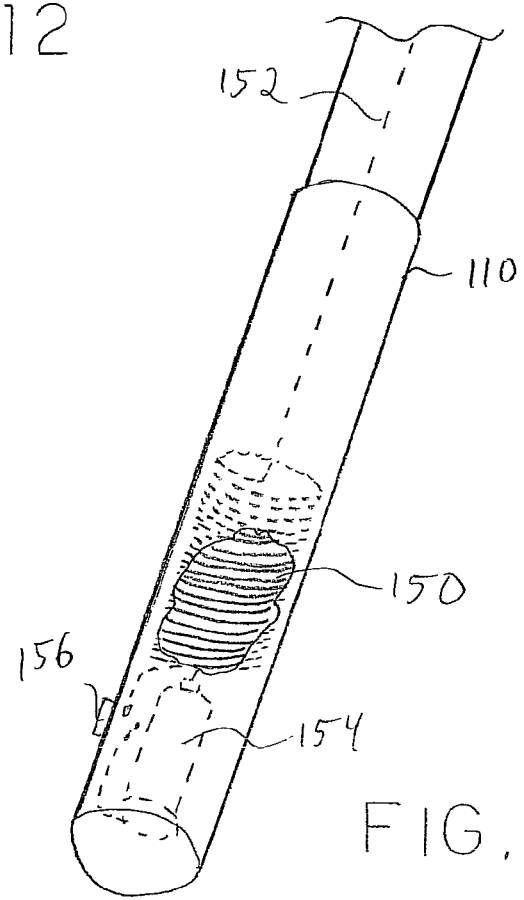
Figure 14:
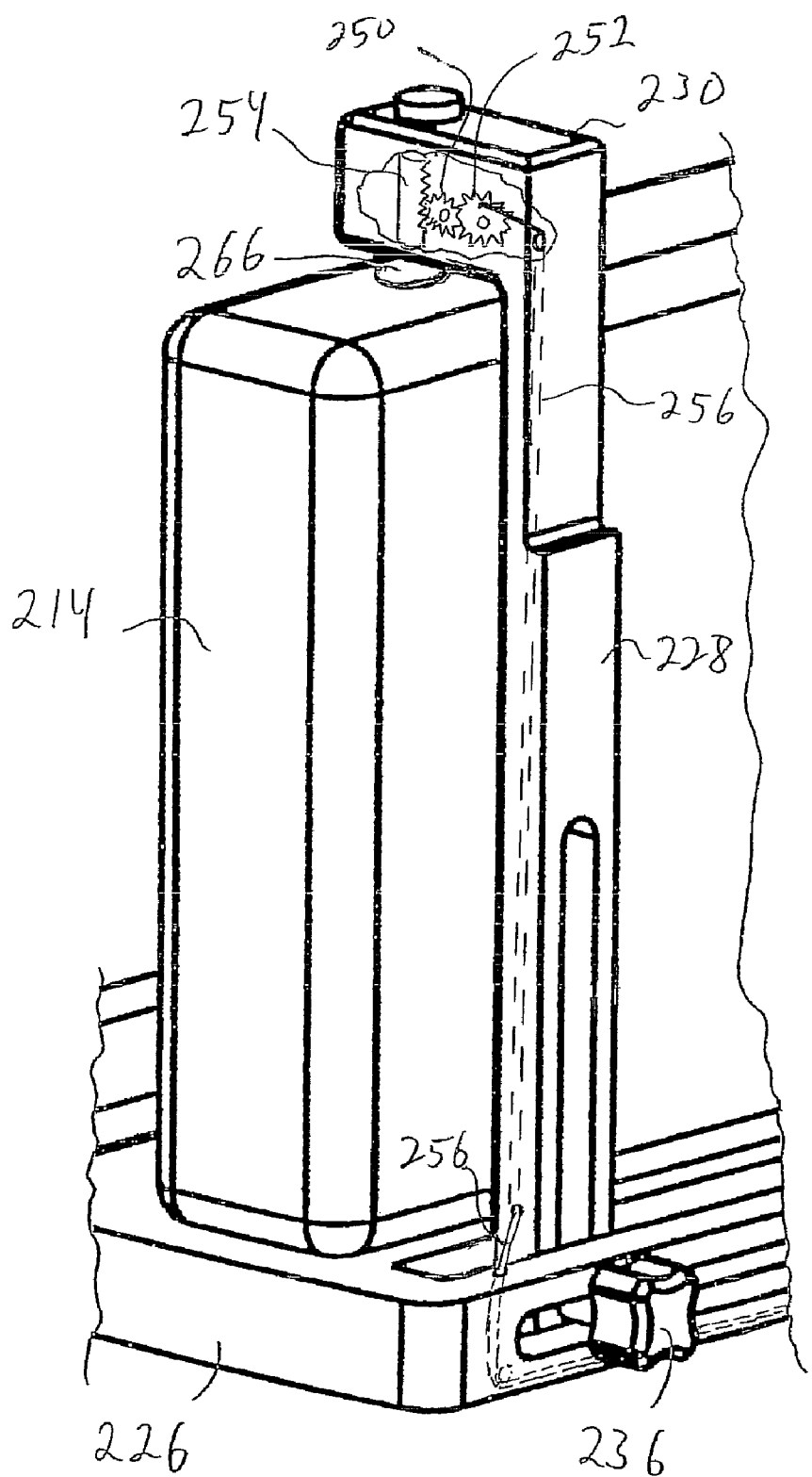
FIG. 14 shows an illustrative diagrammatic view of a system in accordance with a further embodiment of the invention.
Figure 1:
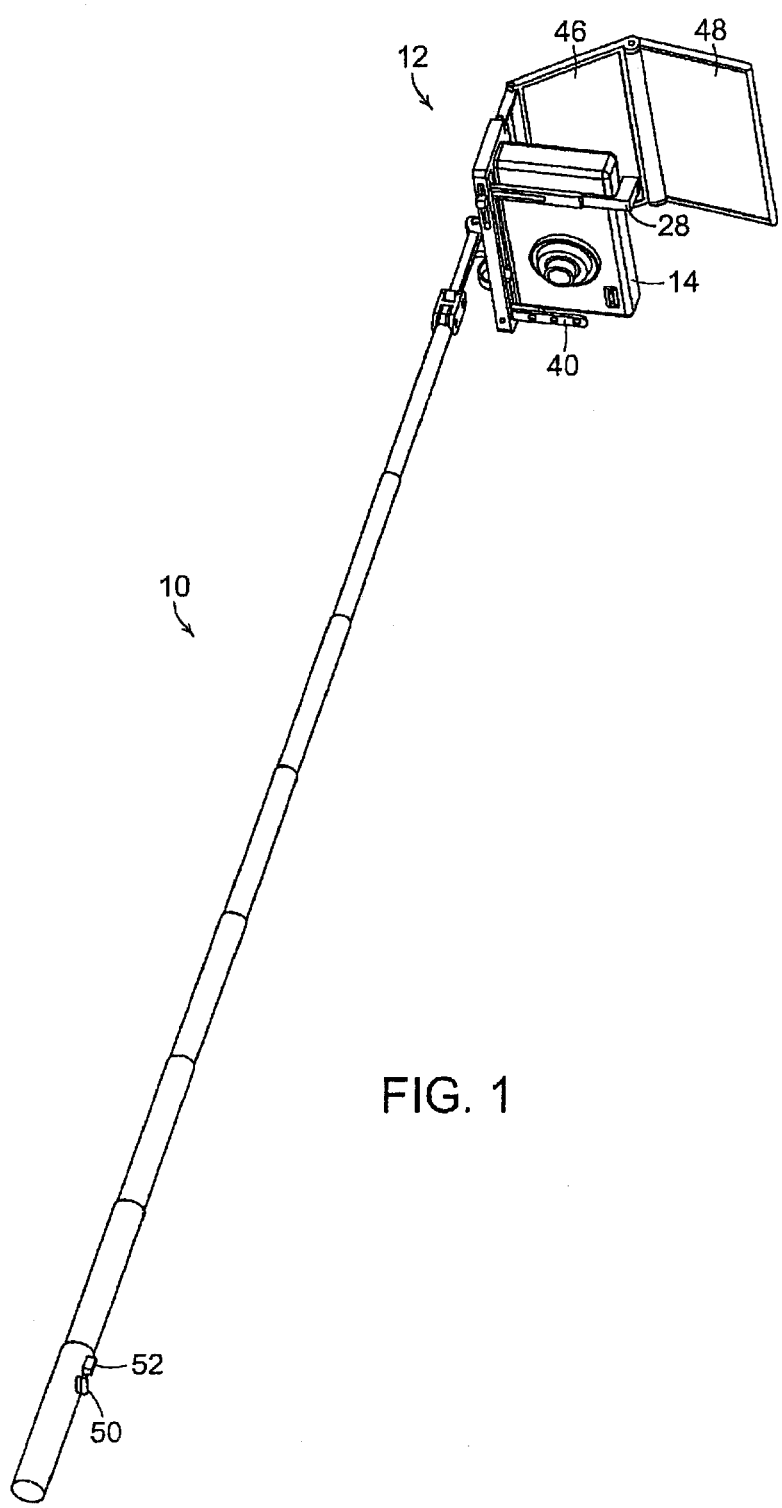
Figure 3:
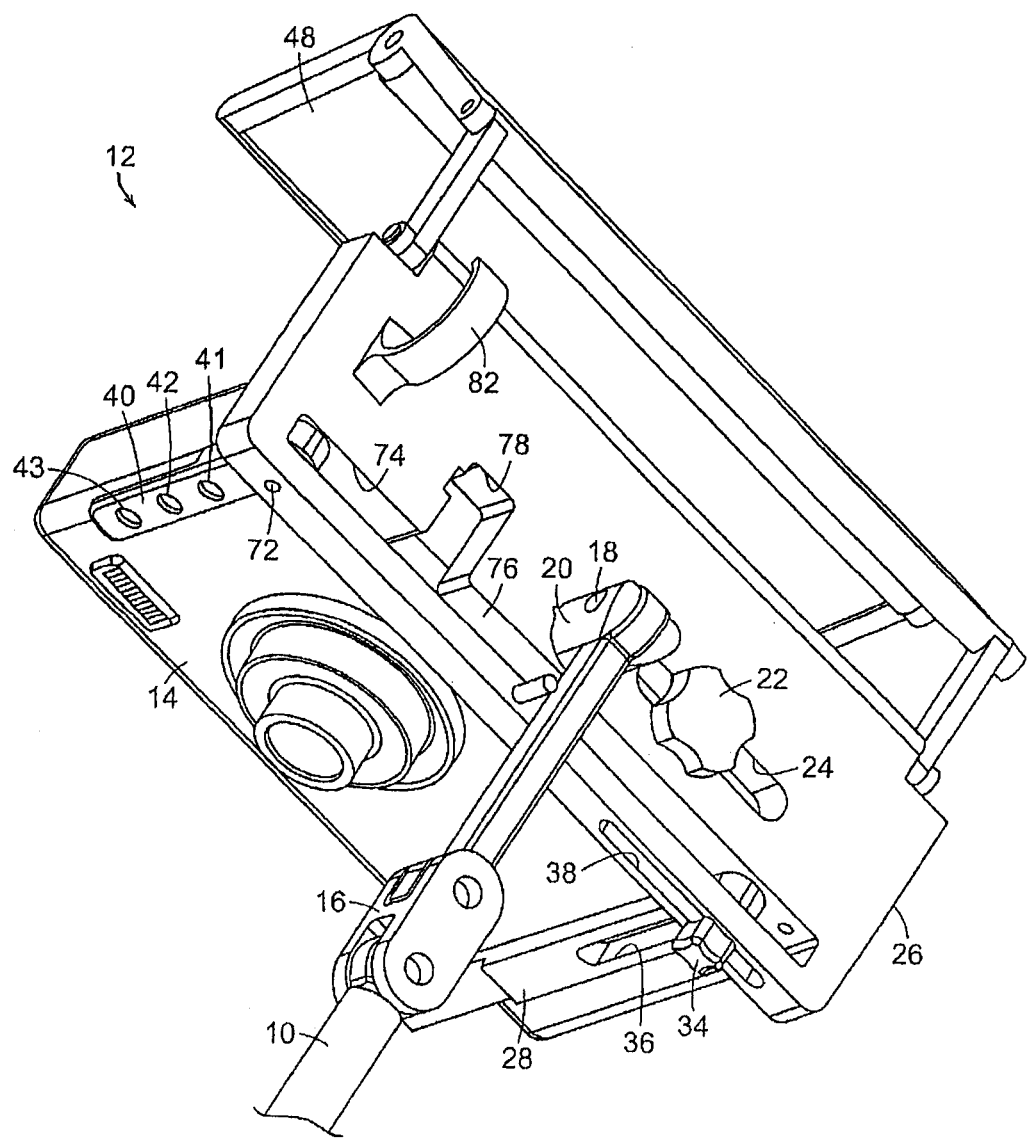
Figure 4:
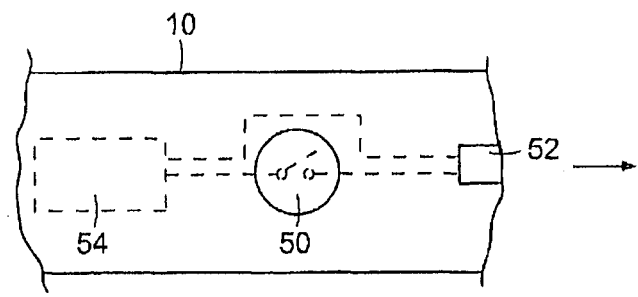
Figure 7:
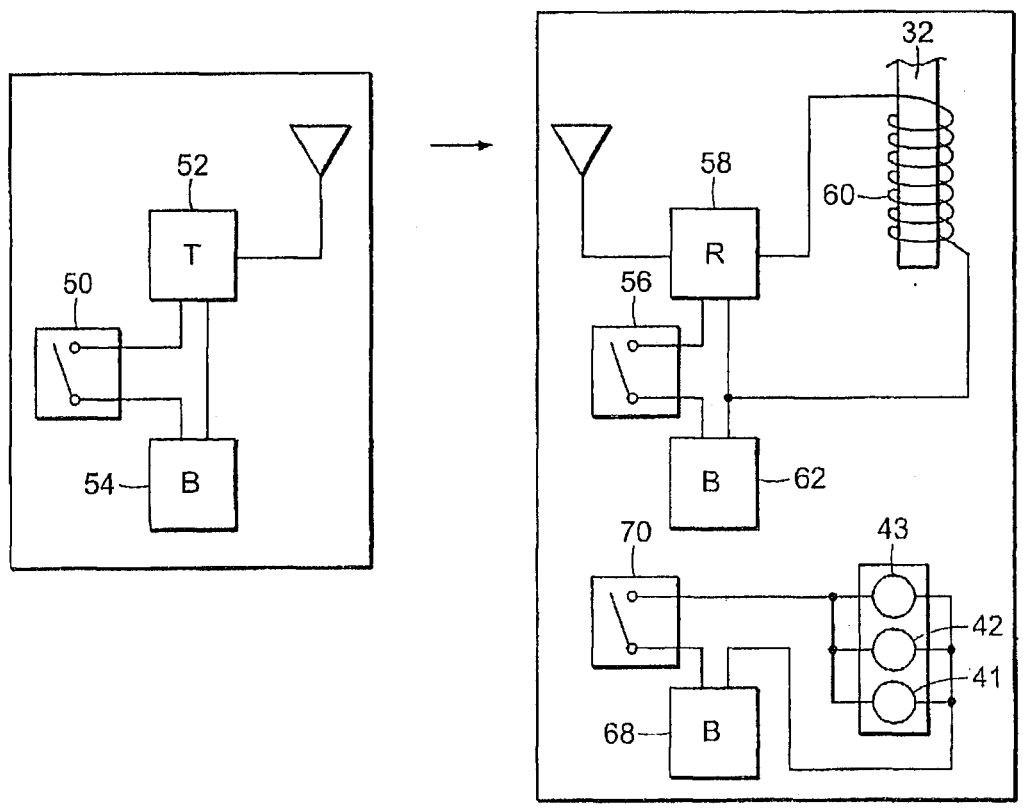
Figure 5:
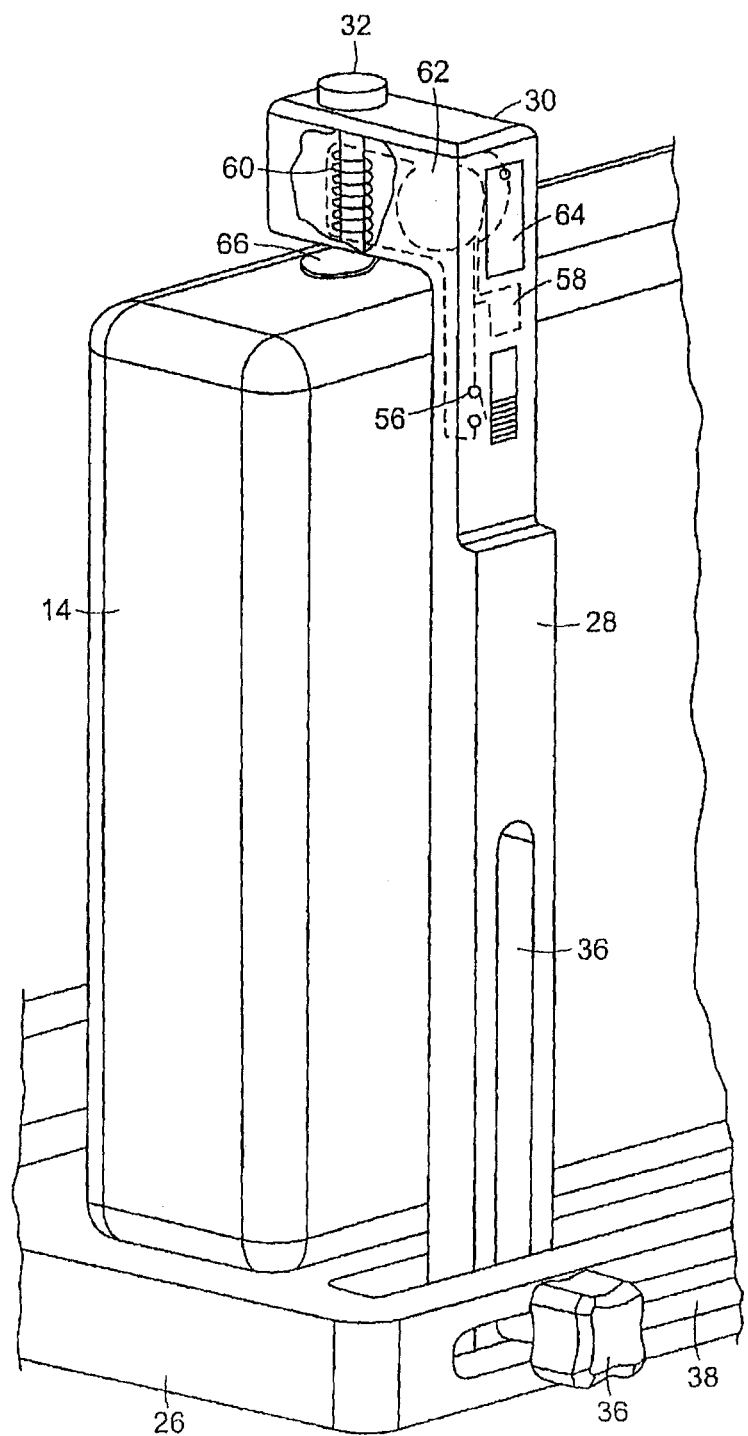
Figure 6C:
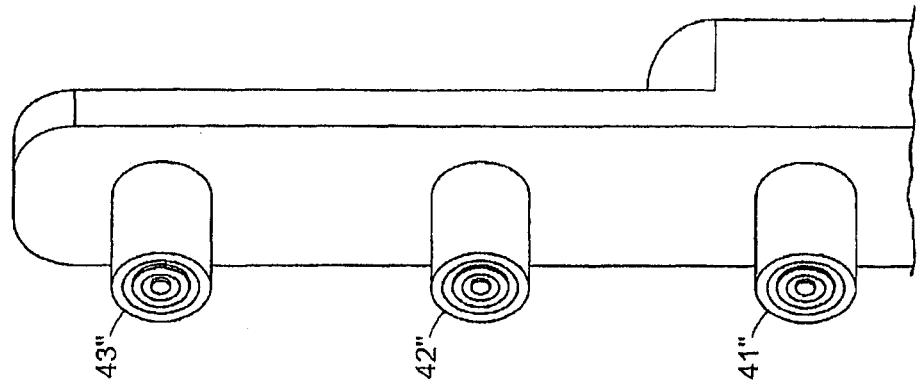
Figure 6B:
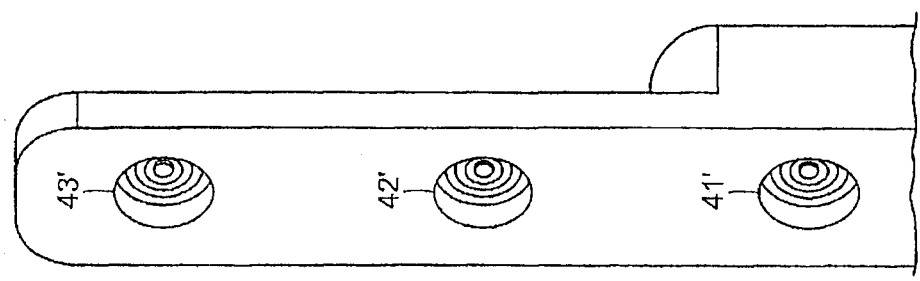
Figure 6A:
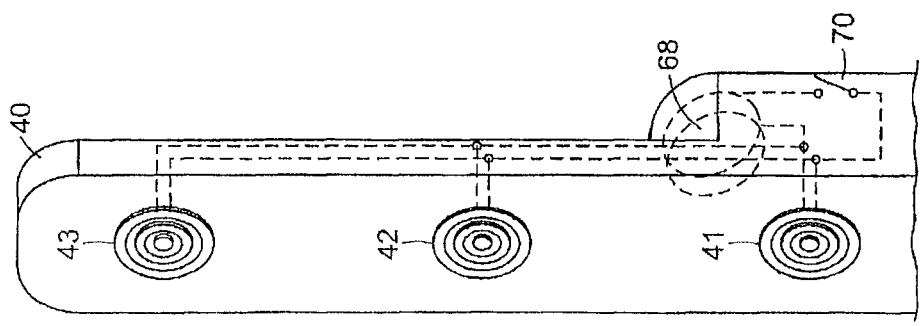
Figure 8:
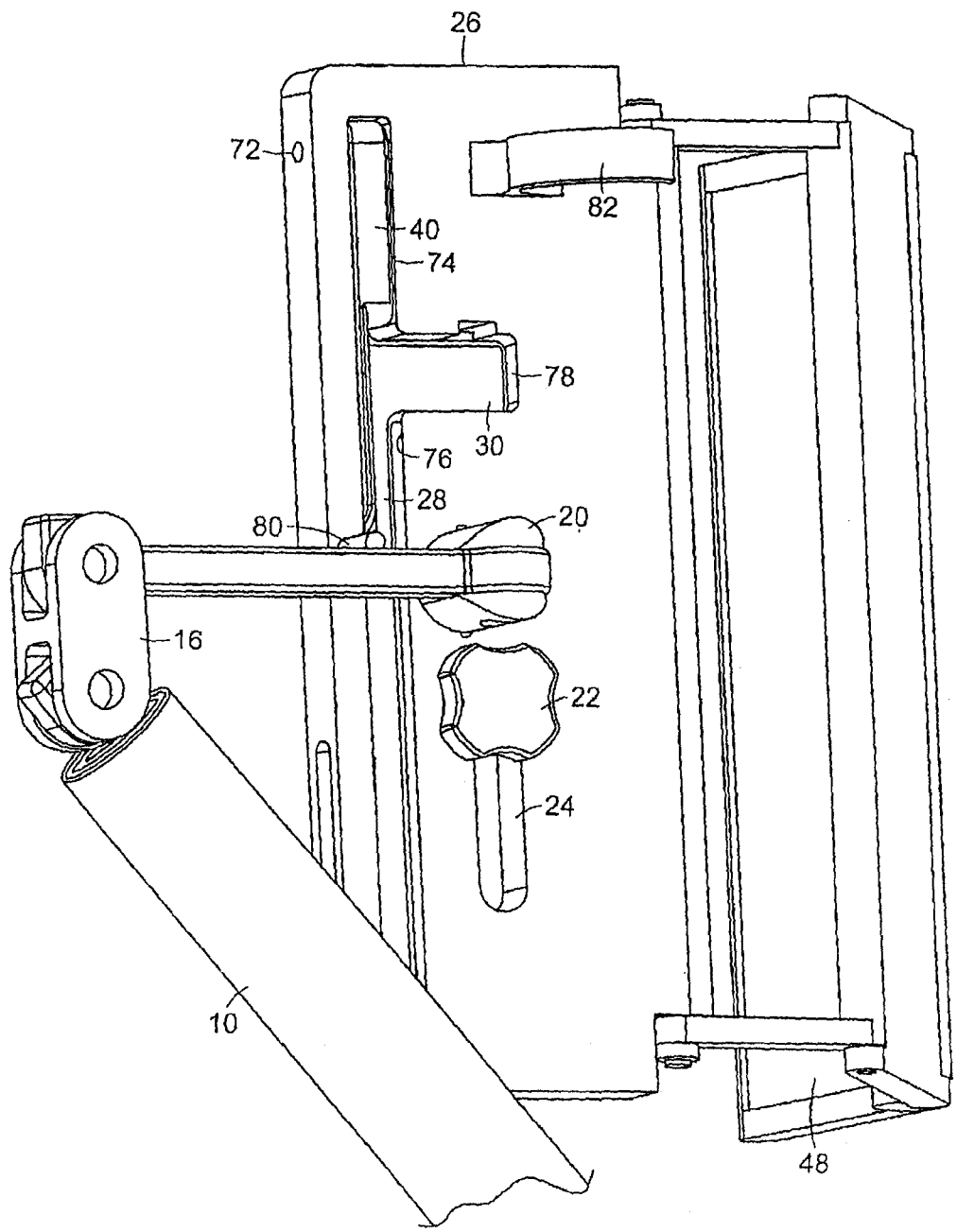
Figure 9:
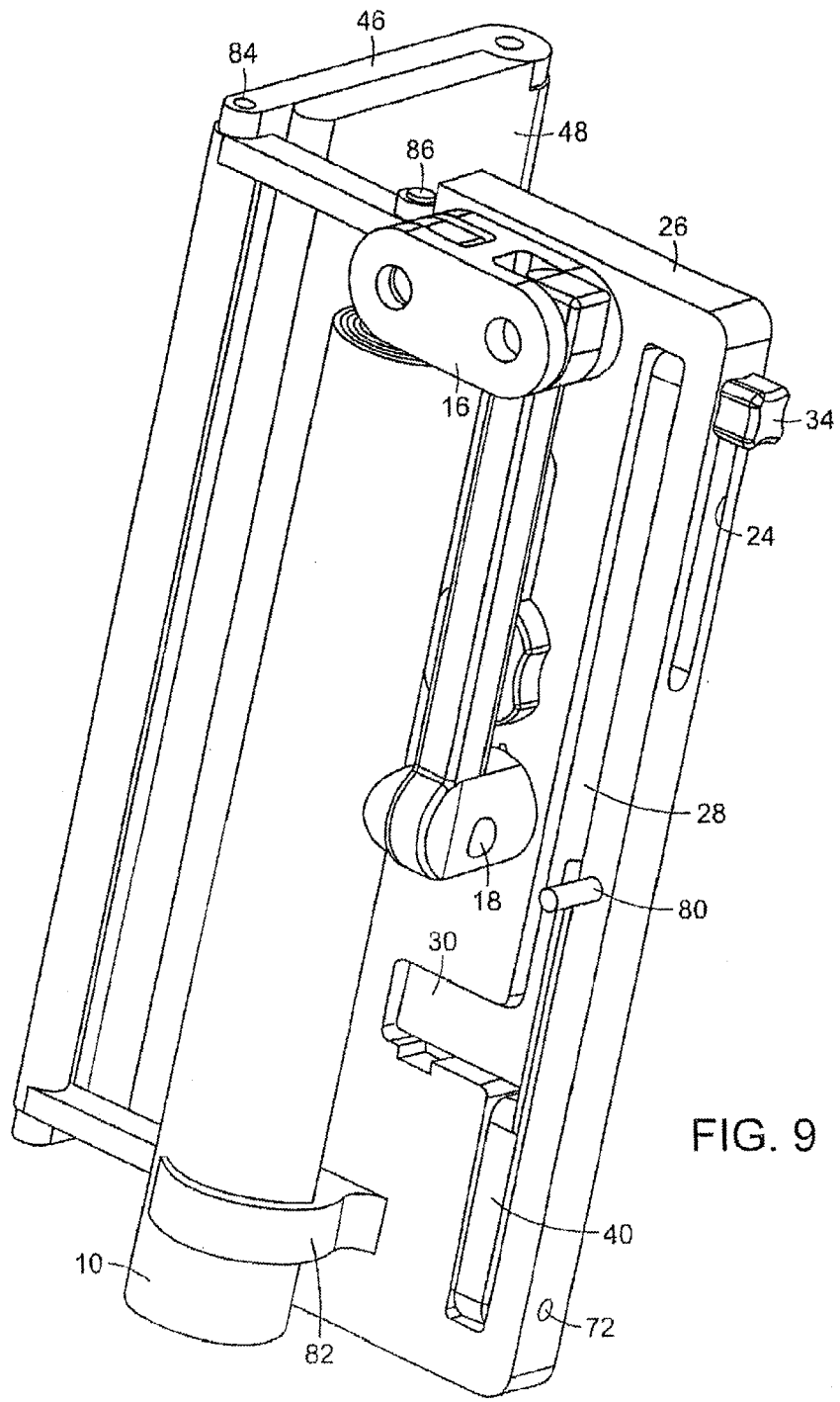
Figure 10:
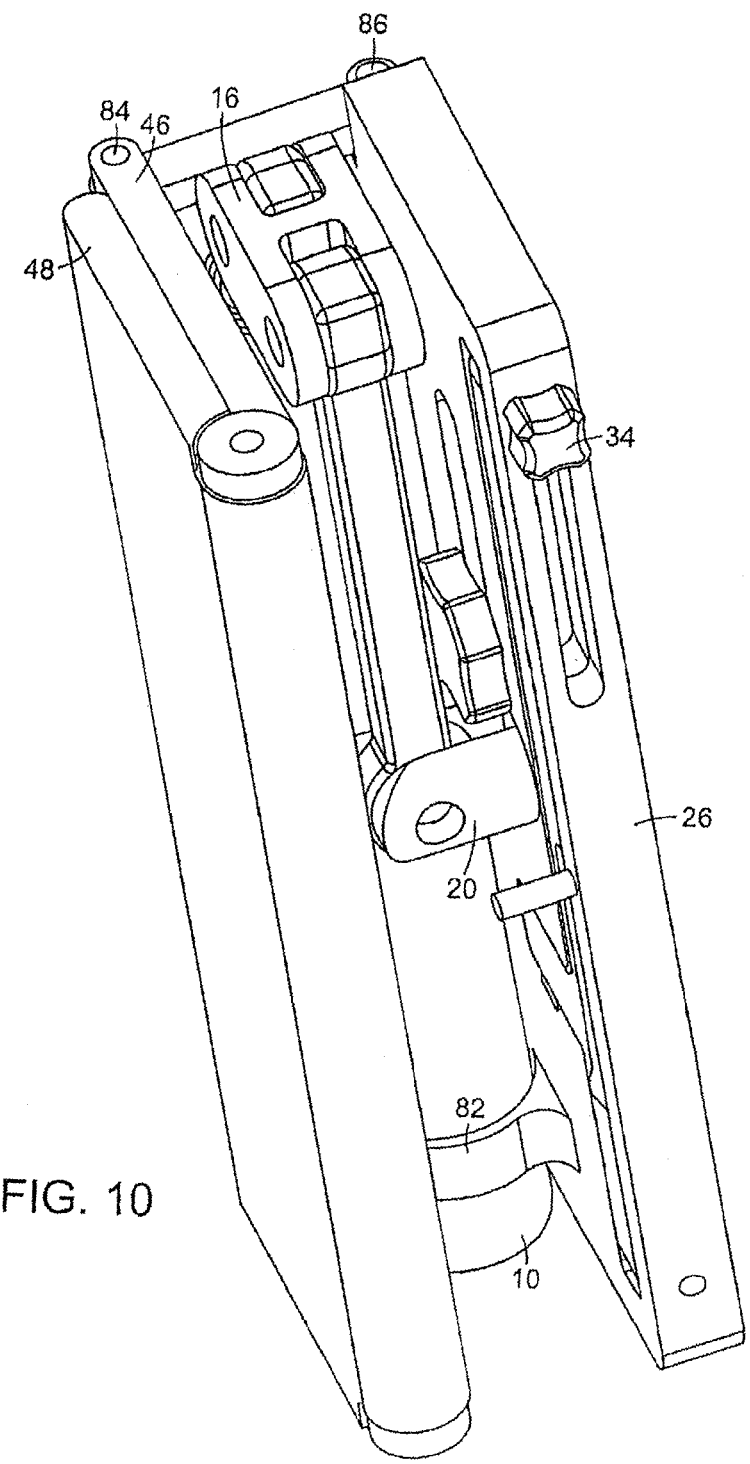
Figure 11:
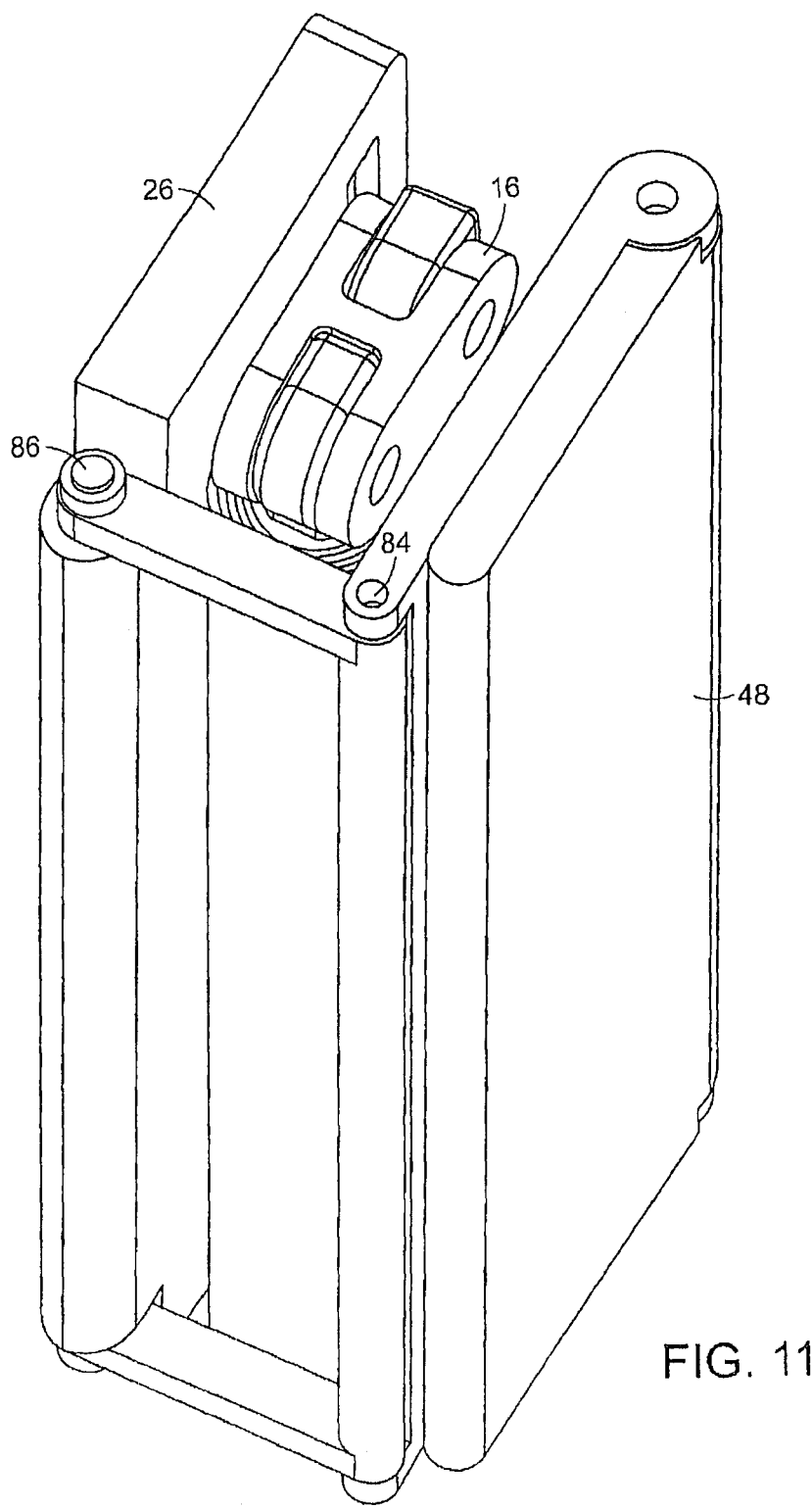
Figure 13:
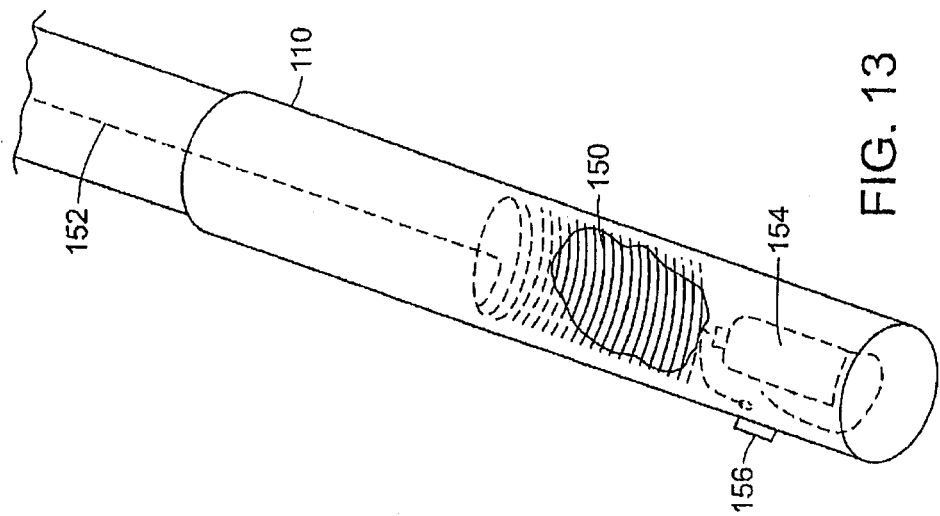
Figure 12:
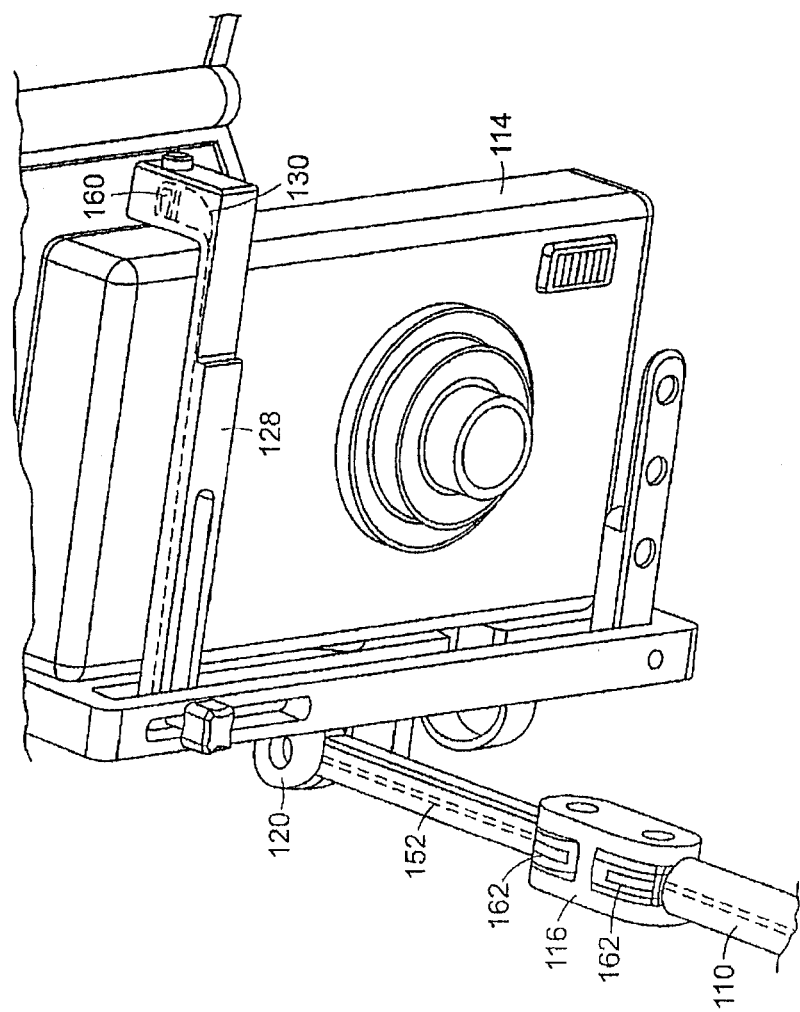
Figure 14:
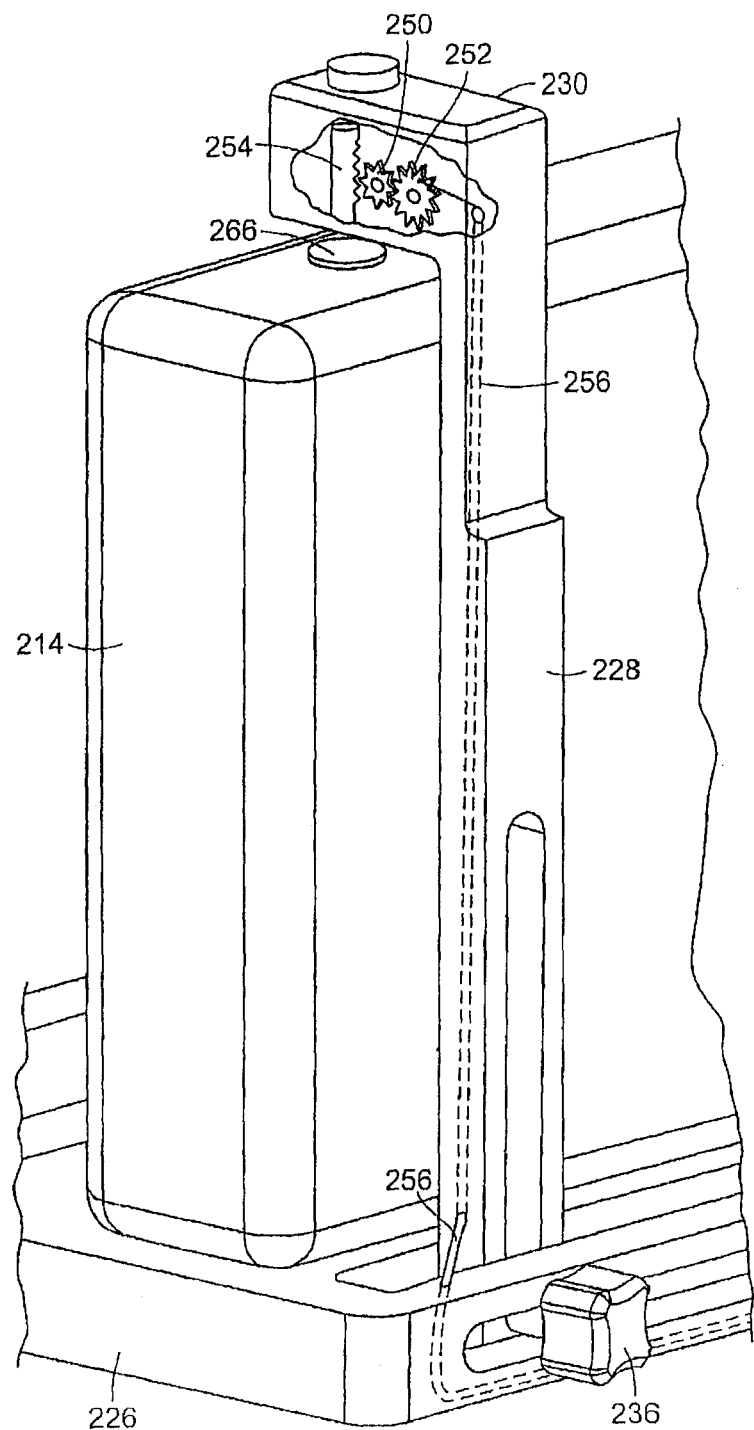

FIGS. 12 and 13 show a system in accordance with another embodiment of the invention in which a telescoping wand 110 includes a spring loaded coil 150 of a two wire pair for actuating a solenoid 160 in an actuator portion 130 of an actuator arm 128. The coil of wire 150 is biased in the recoiled position within the wand 110, and permits a portion 152 of the wire to be drawn from the coil 150 when the telescoping wand 110 is extended. The wand 110 also includes a battery 154 and a switch 156 for actuating the solenoid remotely to thereby press the shutter button on the camera 114. The wire pair 152 may pass through slotted openings 162 in the double hinge unit 116. In certain embodiments, the electrical continuity through a joint may be provided by a flexible connector that bypasses the joint, or may be provided by abutting movable contacts for providing the electrical continuity from the wand 110 to the solenoid 160.

In accordance with yet another embodiment, a system of the invention includes a gear assembly in an actuator portion 230 of an actuator arm 228 for depressing the shutter button 266 on a camera 214. The gear assembly includes a pair of mutually engaged gears 250 and 252, one of which 252 is provided with an offset draw pin that is fixed to a cable 256. The other gear 250 is rotatably engaged with a linear gear 254 that presses the shutter button 266 on a camera 214 when actuated. The gears are actuated when the cable 256 is pulled, causing the gear 252 to rotated, which then causes the gear 250 to rotate, and the linear gear 254 to move downward. The gear 252 is also designed to be biased in the counter rotated position such that the linear gear 254 is biased in the retracted (raised) position. The other end of the cable 256 (remote from the camera) is provided in a telescoping wand in a biased retracted coil similar to that shown in FIG. 13 for the conductive wire, and includes an exposed pull ring or switch in the wand for actuating the gear assembly remotely.

Those skilled in the art will appreciate that numerous modifications and variations may be made to the above disclosed embodiments without departing from the spirit and scope of the invention.

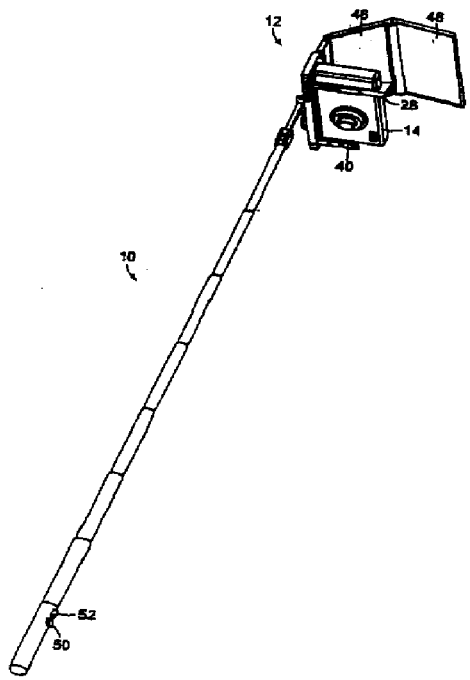

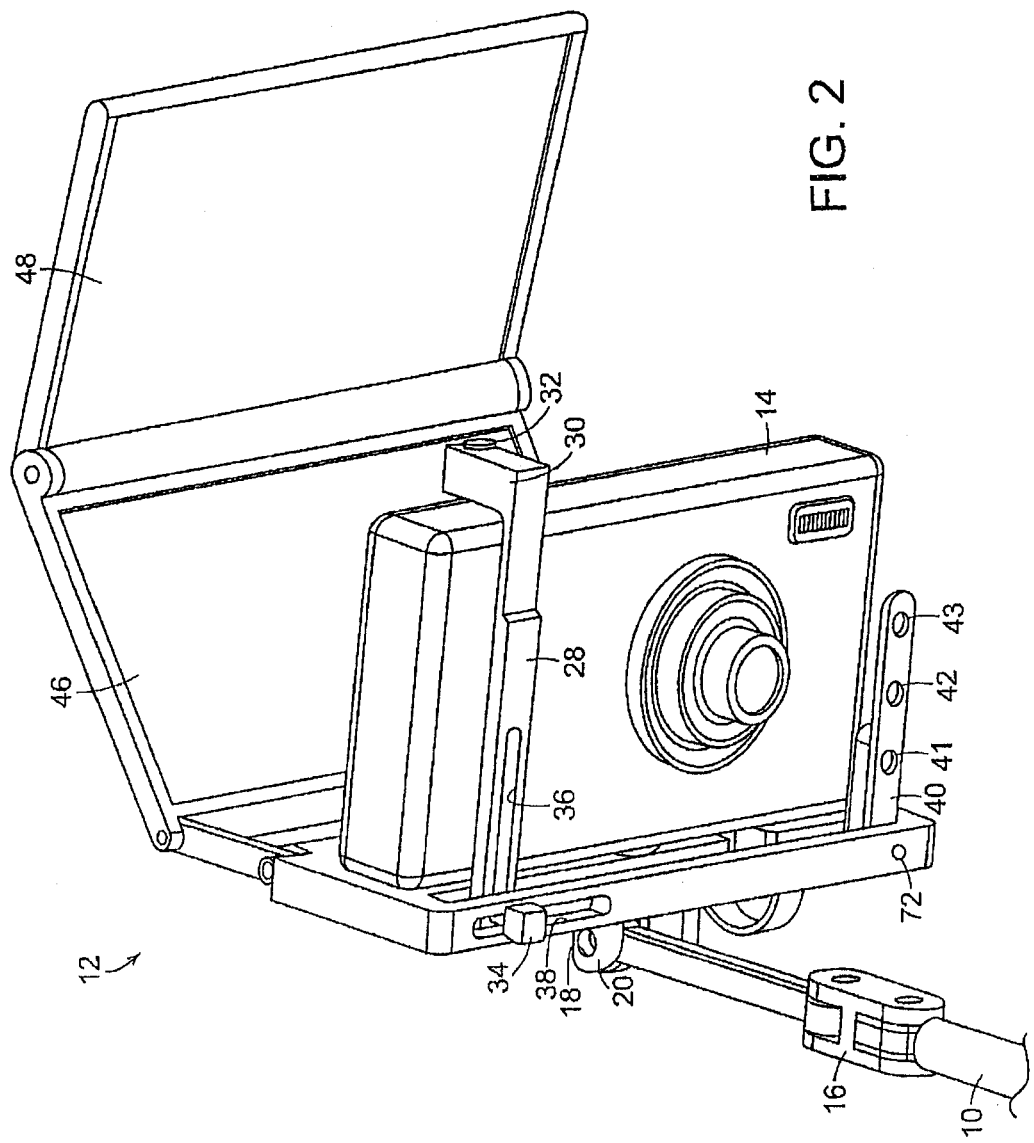

What is claimed is:

1. A portable camera actuation system for taking self-portraits, said system comprising:
   an extendable handle assembly that is holdable by a user at a first end thereof;
   a base unit coupled to a second end of said extendable handle assembly, said base unit for receiving a camera mounted thereon;
   a remote shutter transmitter unit for providing a wireless shutter signal, said remote shutter transmitter unit being provided at a location that is remote from the camera;
   alignment means for permitting the user of the system and a camera to verify proper alignment of the camera with respect to a subject, wherein said alignment means includes a plurality of indicators that are viewable by the user while taking a self-portrait with the camera, and wherein said indicators each includes a light emitting diode; and
   a wireless shutter signal receiver unit coupled to the base unit for providing actuation of an external shutter button on the camera responsive to the wireless shutter signal.

2. The system as claimed in claim 1, wherein said remote shutter transmitter unit is provided within a portion of said extendable handle.

3. The system as claimed in claim 1, wherein said remote shutter transmitter unit provides infrared signals to the wireless shutter signal receiver unit.

4. The system as claimed in claim 1, wherein said system further includes a plurality of mirrors for providing that an image of the field of view of the camera is viewable by a user while taking a self-portrait.

5. The system as claimed in claim 4, wherein said plurality of mirrors are foldable upon one another when the system is not in use.

6. The system as claimed in claim 1, wherein said extendable handle is collapsible and foldable onto the base unit when the camera is not in use.

7. The system as claimed in claim 1, wherein said wireless shutter signal receiver unit is foldable onto the base unit when the camera is not in use.

8. The system as claimed in claim 1, wherein said alignment means is foldable onto the base unit when the camera is not in use.

9. A portable camera actuation system for taking self-portraits, said system comprising:
   an extendable handle assembly that is holdable by a user at a first end thereof;
   a base unit coupled to a second end of said extendable handle assembly, said base unit for receiving a camera mounted thereon;
   a remote shutter transmitter unit for providing a wireless shutter signal, said remote shutter transmitter unit being provided at a location that is remote from the camera;
   alignment means for permitting the user of the system and a camera to verify proper alignment of the camera with respect to a subject, wherein said alignment means includes a plurality of indicators that are viewable by the user while taking a self-portrait with the camera, and wherein said indicators each includes a Fresnel lens; and
   a wireless shutter signal receiver unit coupled to the base unit for providing actuation of an external shutter button on the camera responsive to the wireless shutter signal.

10. The system as claimed in claim 9, wherein said remote shutter transmitter unit is provided within a portion of said extendable handle.

11. The system as claimed in claim 9, wherein said remote shutter transmitter unit provides infrared signals to the wireless shutter signal receiver unit.

12. The system as claimed in claim 9, wherein said system further includes a plurality of mirrors for providing that an image of the field of view of the camera is viewable by a user while taking a self-portrait.

13. The system as claimed in claim 12, wherein said plurality of mirrors are foldable upon one another when the system is not in use.

14. The system as claimed in claim 9, wherein said extendable handle is collapsible and foldable onto the base unit when the camera is not in use.

15. The system as claimed in claim 9, wherein said wireless shutter signal receiver unit is foldable onto the base unit when the camera is not in use.

16. The system as claimed in claim 9, wherein said alignment means is foldable onto the base unit when the camera is not in use.

17. A portable camera actuation system for taking self-portraits, said system comprising:
   an extendable handle assembly that is holdable by a user at a first end thereof;
   a base unit coupled to a second end of said extendable handle assembly, said base unit for receiving a camera mounted thereon;
   a remote shutter transmitter unit for providing a wireless shutter signal, said remote shutter transmitter unit being provided at a location that is remote from the camera;
   a plurality of mirrors for providing that an image of the field of view of the camera is viewable by the user while taking a self-portrait; and
   a wireless shutter signal receiver unit coupled to the base unit for providing actuation of an external shutter button on the camera responsive to the wireless shutter signal.

18. The system as claimed in claim 17, wherein said remote shutter transmitter unit is provided within a portion of said extendable handle.

19. The system as claimed in claim 17, wherein said remote shutter transmitter unit provides infrared signals to the wireless shutter signal receiver unit.

20. The system as claimed in claim 17, wherein said system further includes alignment means for permitting a user of the system and a camera to verify proper alignment of the camera with respect to a subject.

21. The system as claimed in claim 20, wherein said alignment means is foldable onto the base unit when the camera is not in use.

22. The system as claimed in claim 20, wherein said alignment means include a plurality of indicators that are viewable by the user while taking a self-portrait with the camera.

23. The system as claimed in claim 22, wherein said indicators each include a light emitting diode.

24. The system as claimed in claim 22, wherein said indicators each include a Fresnel lens.

25. The system as claimed in claim 17, wherein said plurality of mirrors are foldable upon one another when the system is not in use.

26. The system as claimed in claim 17, wherein said extendable handle is collapsible and foldable onto the base unit when the camera is not in use.

27. The system as claimed in claim 17, wherein said wireless shutter signal receiver unit is foldable onto the base unit when the camera is not in use.

28. A portable camera actuation system for taking self-portraits, said system comprising:
an extendable handle assembly that is holdable by a user at a first end thereof;
a base unit coupled to a second end of said extendable handle assembly, said base unit for receiving a camera mounted thereon;
a remote shutter transmitter unit for providing a wireless shutter signal, said remote shutter transmitter unit being provided at a location that is remote from the camera; and
a wireless shutter signal receiver unit coupled to the base unit for providing actuation of an external shutter button on the camera responsive to the wireless shutter signal, wherein said wireless shutter signal receiver unit is foldable onto the base unit when the camera is not in use.

29. The system as claimed in claim 28, wherein said remote shutter transmitter unit is provided within a portion of said extendable handle.

30. The system as claimed in claim 28, wherein said remote shutter transmitter unit provides infrared signals to the wireless shutter signal receiver unit.

31. The system as claimed in claim 28, wherein said system further includes alignment means for permitting a user of the system and a camera to verify proper alignment of the camera with respect to a subject.

32. The system as claimed in claim 31, wherein said alignment means include a plurality of indicators that are viewable by the user while taking a self-portrait with the camera.

33. The system as claimed in claim 32, wherein said indicators each include a light emitting diode.

34. The system as claimed in claim 32, wherein said indicators each include a Fresnel lens.

35. The system as claimed in claim 31, wherein said alignment means is foldable onto the base unit when the camera is not in use.

36. The system as claimed in claim 28, wherein said system further includes a plurality of mirrors for providing that an image of the field of view of the camera is viewable by a user while taking a self-portrait.

37. The system as claimed in claim 36, wherein said plurality of mirrors are foldable upon one another when the system is not in use.

38. The system as claimed in claim 28, wherein said extendable handle is collapsible and foldable onto the base unit when the camera is not in use.

39. A portable camera actuation system for taking self-portraits, said system comprising:
an extendable handle assembly that is holdable by a user at a first end thereof;
a base unit coupled to a second end of said extendable handle assembly, said base unit for receiving a camera mounted thereon;
a remote shutter transmitter unit for providing a wireless shutter signal, said remote shutter transmitter unit being provided at a location that is remote from the camera;
alignment means for permitting the user of the system and a camera to verify proper alignment of the camera with respect to a subject, wherein said alignment means is foldable onto the base unit when the camera is not in use; and
a wireless shutter signal receiver unit coupled to the base unit for providing actuation of an external shutter button on the camera responsive to the wireless shutter signal.

40. The system as claimed in claim 39, wherein said remote shutter transmitter unit is provided within a portion of said extendable handle.

41. The system as claimed in claim 39, wherein said remote shutter transmitter unit provides infrared signals to the wireless shutter signal receiver unit.

42. The system as claimed in claim 39, wherein said alignment means include a plurality of indicators that are viewable by the user while taking a self-portrait with the camera.

43. The system as claimed in claim 42, wherein said indicators each include a light emitting diode.

44. The system as claimed in claim 42, wherein said indicators each include a Fresnel lens.

45. The system as claimed in claim 39, wherein said system further includes a plurality of mirrors for providing that an image of the field of view of the camera is viewable by a user while taking a self-portrait.

46. The system as claimed in claim 45, wherein said plurality of mirrors are foldable upon one another when the system is not in use.

47. The system as claimed in claim 39, wherein said extendable handle is collapsible and foldable onto the base unit when the camera is not in use.

48. The system as claimed in claim 39, wherein said wireless shutter signal receiver unit is foldable onto the base unit when the camera is not in use.

49. A portable camera actuation system for taking self-portraits, said system comprising:
an extendable handle assembly that is holdable by a user at a first end thereof;
a base unit coupled to a second end of said extendable handle assembly, said base unit for receiving a camera mounted thereon; and
alignment means for permitting the user of the system and a camera to verify proper alignment of the camera with respect to a subject by viewing a plurality of alignment indicators coupled to the base unit, wherein said alignment indicators each include a light emitting diode.

50. The system as claimed in claim 49, wherein said alignment means is foldable onto the base unit when the camera is not in use.

51. The system as claimed in claim 49, wherein said extendable handle is collapsible and foldable onto the base unit when the camera is not in use.

52. The system as claimed in claim 49, wherein said system further includes
a remote shutter transmitter unit for providing a wireless shutter signal, said remote shutter transmitter unit being provided at a location that is remote from the camera; and
a wireless shutter signal receiver unit coupled to the base unit for providing actuation of an external shutter button on the camera responsive to the wireless shutter signal.

53. The system as claimed in claim 49, wherein said system remote shutter transmitter unit provides infrared signals to the wireless shutter signal receiver unit.

54. A portable camera actuation system for taking self-portraits, said system comprising:
an extendable handle assembly that is holdable by a user at a first end thereof;
a base unit coupled to a second end of said extendable handle assembly, said base unit for receiving a camera mounted thereon; and alignment means for permitting the user of the system and a camera to verify proper alignment of the camera with respect to a subject by viewing a plurality of alignment indicators coupled to the base unit, wherein said alignment indicators each includes a Fresnel lens.

55. The system as claimed in claim 54, wherein said alignment means is foldable onto the base unit when the camera is not in use.

56. The system as claimed in claim 54, wherein said extendable handle is collapsible and foldable onto the base unit when the camera is not in use.

57. The system as claimed in claim 54, wherein said system further includes
- a remote shutter transmitter unit for providing a wireless shutter signal, said remote shutter transmitter unit being provided at a location that is remote from the camera; and
- a wireless shutter signal receiver unit coupled to the base unit for providing actuation of an external shutter button on the camera responsive to the wireless shutter signal.

58. The system as claimed in claim 54, wherein said system remote shutter transmitter unit provides infrared signals to the wireless shutter signal receiver unit.

59. A portable camera actuation system for taking self-portraits, said system comprising:
- an extendable handle assembly that is holdable by a user at a first end thereof;
- a base unit coupled to a second end of said extendable handle assembly, said base unit for receiving a camera mounted thereon; and
- alignment means for permitting the user of the system and a camera to verify proper alignment of the camera with respect to a subject by viewing a plurality of alignment indicators coupled to the base unit, wherein said alignment means is foldable onto the base unit when the camera is not in use.

60. The system as claimed in claim 59, wherein said alignment indicators each include a light emitting diode.

61. The system as claimed in claim 59, wherein said alignment indicators each include a Fresnel lens.

62. The system as claimed in claim 59, wherein said extendable handle is collapsible and foldable onto the base unit when the camera is not in use.

63. The system as claimed in claim 59, wherein said system further includes
- a remote shutter transmitter unit for providing a wireless shutter signal, said remote shutter transmitter unit being provided at a location that is remote from the camera; and
- a wireless shutter signal receiver unit coupled to the base unit for providing actuation of an external shutter button on the camera responsive to the wireless shutter signal.

64. The system as claimed in claim 59, wherein said system remote shutter transmitter unit provides infrared signals to the wireless shutter signal receiver unit.

* * * * *

UNITED STATES PATENT AND TRADEMARK OFFICE
CERTIFICATE OF CORRECTION

| | | |
|---|---|---|
| PATENT NO. | : 7,706,673 B1 | Page 1 of 14 |
| APPLICATION NO. | : 11/697406 | |
| DATED | : April 27, 2010 | |
| INVENTOR(S) | : Staudinger et al. | |

It is certified that error appears in the above-identified patent and that said Letters Patent is hereby corrected as shown below:

The title page showing illustrative figure should be deleted to be replaced with the attached title page.

The drawing sheets, consisting of figs 1-12 should be deleted to be replaced with the drawing sheets consisting of figs 1-12, as shown on the attached pages.

Signed and Sealed this

Twenty-fourth Day of August, 2010

David J. Kappos
*Director of the United States Patent and Trademark Office*

(12) United States Patent
Staudinger et al.

(10) Patent No.: US 7,706,673 B1
(45) Date of Patent: Apr. 27, 2010

(54) PORTABLE REMOTE CAMERA CONTROL DEVICE

(76) Inventors: Robert J. Staudinger, 807 Stoch Dr., Bridgewater, NJ (US) 08807; Maria Chevere-Santos, 2704 Lynbrook Dr., Yardley, PA (US) 19067; Ruijun Zhou, 845 51st St., Brooklyn, NY (US) 11220

(*) Notice: Subject to any disclaimer, the term of this patent is extended or adjusted under 35 U.S.C. 154(b) by 213 days.

(21) Appl. No.: 11/697,406

(22) Filed: Apr. 6, 2007

(51) Int. Cl.
*G03B 17/00* (2006.01)
*H04N 5/232* (2006.01)

(52) U.S. Cl. .................. 396/58; 396/425; 396/428; 348/211.2; 348/376

(58) Field of Classification Search .................. 396/58, 396/59, 56, 419–428; 348/211.99, 211.1, 348/211.2, 373, 376
See application file for complete search history.

(56) References Cited

U.S. PATENT DOCUMENTS

| | | | |
|---|---|---|---|
| 2,868,096 A | 1/1959 | Rothfjell | |
| 4,530,580 A | 7/1985 | Ueda et al. | |
| 5,768,645 A | 6/1998 | Kessler | |
| 6,130,992 A | 10/2000 | Hamlin | |
| 6,862,407 B2 * | 3/2005 | Gale | 396/59 |
| 6,923,542 B2 | 8/2005 | Harris | |
| 6,955,484 B2 | 10/2005 | Woodman | |
| 6,988,802 B2 | 1/2006 | Harris | |
| 6,994,436 B2 | 2/2006 | Harris | |
| 2003/0044180 A1 | 3/2003 | Lindberg | |
| 2005/0031335 A1 | 2/2005 | Itzkowitz | |

* cited by examiner

*Primary Examiner*—Rochelle-Ann J Blackman
(74) *Attorney, Agent, or Firm*—Gauthier & Connors LLP

(57) ABSTRACT

A portable camera actuation system is disclosed that may be used for taking self-portraits. The system includes an extendable handle assembly that may be held by a user at a first end thereof, and a base unit coupled to a second end of said extendable handle assembly. The base unit is for receiving a camera mounted thereon. The system also includes a remote shutter transmitter unit for providing a wireless shutter signal, and a remote wireless signal receiver unit. The remote shutter transmitter unit is provided at a location that is remote from the camera. The wireless shutter signal receiver unit is coupled to the base unit and is for providing actuation of an external shutter button on the camera responsive to the wireless shutter signal.

64 Claims, 12 Drawing Sheets